US008449390B2

(12) United States Patent
Kaminkow

(10) Patent No.: US 8,449,390 B2
(45) Date of Patent: *May 28, 2013

(54) GAMING DEVICE HAVING A MULTI-TRIGGER BONUS

(75) Inventor: Joseph E. Kaminkow, Reno, NV (US)

(73) Assignee: IGT, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/430,226

(22) Filed: Mar. 26, 2012

(65) Prior Publication Data

US 2012/0184357 A1 Jul. 19, 2012

Related U.S. Application Data

(63) Continuation of application No. 10/231,653, filed on Aug. 30, 2002, now Pat. No. 8,157,633.

(51) Int. Cl.
*A63F 13/02* (2006.01)
*A63F 13/10* (2006.01)

(52) U.S. Cl.
USPC .................... 463/29; 463/16; 463/20; 463/25

(58) Field of Classification Search
USPC ................. 463/16, 20, 25, 29, 11–13, 17–19, 463/26–28, 30–33, 40–42
See application file for complete search history.

(56) References Cited

U.S. PATENT DOCUMENTS

| | | | |
|---|---|---|---|
| 4,621,814 | A | 11/1986 | Stepan et al. |
| 4,756,531 | A | 7/1988 | DiRe et al. |
| 4,836,546 | A | 6/1989 | DiRe et al. |
| 4,838,552 | A | 6/1989 | Hagiwara |
| 4,856,787 | A | 8/1989 | Itkis |
| 5,332,219 | A | 7/1994 | Marnell, II et al. |
| 5,356,140 | A | 10/1994 | Dabrowski et al. |
| 5,393,057 | A | 2/1995 | Marnell, II |
| 5,560,603 | A | 10/1996 | Seelig et al. |
| 5,580,053 | A | 12/1996 | Crouch |
| 5,722,891 | A | 3/1998 | Inoue |
| 5,779,544 | A | 7/1998 | Seelig et al. |
| 5,807,172 | A | 9/1998 | Piechowiak |
| 5,823,874 | A | 10/1998 | Adams |
| D400,597 | S | 11/1998 | Hedrick et al. |
| 5,836,819 | A | 11/1998 | Ugawa |
| 5,882,261 | A | 3/1999 | Adams |
| 5,890,962 | A | 4/1999 | Takemoto |
| 5,911,418 | A | 6/1999 | Adams |

(Continued)

FOREIGN PATENT DOCUMENTS

GB 2 117 952 10/1983

OTHER PUBLICATIONS

Totem Pole Advertisement written by IGT, published in 1997.

(Continued)

*Primary Examiner* — David L Lewis
*Assistant Examiner* — Matthew D. Hoel
(74) *Attorney, Agent, or Firm* — Neal, Gerber & Eisenberg LLP

(57) ABSTRACT

A gaming device having one or more primary games. The primary games may be played simultaneously. Each primary game has a triggering event which corresponds to an award or bonus game. If multiple triggering events occur in the same play, the player receives a multi-trigger bonus or bonus game.

24 Claims, 21 Drawing Sheets

U.S. PATENT DOCUMENTS 5,947,820 A 9/1999 Morro et al.
5,976,015 A 11/1999 Seelig et al.
5,980,384 A 11/1999 Barrie
5,988,643 A 11/1999 Awada
5,997,400 A 12/1999 Seelig et al.
6,004,207 A 12/1999 Wilson, Jr. et al.
6,050,895 A 4/2000 Luciano, Jr. et al.
6,062,980 A * 5/2000 Luciano .......................... 463/20
6,093,102 A 7/2000 Bennett
6,105,962 A 8/2000 Malavazos et al.
6,142,873 A 11/2000 Weiss et al.
6,146,273 A 11/2000 Olsen
6,158,741 A 12/2000 Koelling
6,159,095 A 12/2000 Frohm et al.
6,162,121 A 12/2000 Morro et al.
6,168,520 B1 1/2001 Baerlocher et al.
6,186,894 B1 2/2001 Mayeroff
6,203,429 B1 3/2001 Demar et al.
6,224,483 B1 5/2001 Mayeroff
6,227,971 B1 5/2001 Weiss
6,234,897 B1 5/2001 Frohm et al.
6,244,957 B1 6/2001 Walker et al.
6,261,178 B1 7/2001 Bennett
6,267,669 B1 7/2001 Luciano, Jr. et al.
6,270,412 B1 8/2001 Crawford et al.
6,287,197 B1 9/2001 Dickinson et al.
6,312,334 B1 11/2001 Yoseloff
6,319,124 B1 11/2001 Baerlocher et al.
6,322,309 B1 11/2001 Thomas et al.
6,328,649 B1 12/2001 Randall et al.
6,336,860 B1 1/2002 Webb
6,340,158 B2 1/2002 Pierce et al.
6,346,043 B1 2/2002 Colin et al.
6,347,996 B1 2/2002 Gilmore et al.
6,368,216 B1 4/2002 Hedrick et al.
6,389,645 B1 5/2002 Polidoro
6,394,902 B1 5/2002 Glavich et al.
6,398,645 B1 6/2002 Yoseloff
6,425,823 B1 7/2002 Byrne
6,454,651 B1 9/2002 Yoseloff
6,461,241 B1 10/2002 Webb et al.
6,482,089 B2 11/2002 Demar et al.
6,491,583 B1 12/2002 Gauselmann
6,491,584 B2 12/2002 Graham et al.
D470,895 S 2/2003 Cole
6,517,073 B1 2/2003 Vancura
6,612,927 B1 * 9/2003 Slomiany et al. ............... 463/16
6,626,433 B2 9/2003 Scibetta
6,656,040 B1 12/2003 Brosnan et al.
6,705,944 B2 3/2004 Luciano
6,733,389 B2 5/2004 Webb et al.
6,764,398 B2 7/2004 Stone et al.
6,802,774 B1 10/2004 Carlson et al.
6,837,788 B2 1/2005 Cannon
6,860,810 B2 3/2005 Cannon et al.
6,875,106 B2 4/2005 Weiss et al.
6,921,334 B1 7/2005 Bennett
2002/0071416 A1 6/2002 Carlson et al.
2002/0183105 A1 * 12/2002 Cannon et al. .................. 463/16
2003/0060268 A1 3/2003 Falconer
2003/0176216 A1 9/2003 Storey

OTHER PUBLICATIONS

Creature from the Black Lagoon Advertisement written by IGT, published prior to 2001.
Monopoly Party Train Advertisement written by WMS Gaming, published Aug. 10, 2001.
Lemons, Cherries, and Bell-Fruit Gum, p. 218, by Richard M. Buesel, published by Royal Books, Nov. 1995.

* cited by examiner

GAMING DEVICE HAVING A MULTI-TRIGGER BONUS

PRIORITY CLAIM

This application is a continuation of, and claims priority to and the benefit of, U.S. patent application Ser. No. 10/231,653, filed on Aug. 30, 2002, the entire contents of which are incorporated herein by reference.

CROSS REFERENCE TO RELATED APPLICATIONS

This application is related to the following commonly-owned co-pending patent application: "GAMING DEVICE HAVING A MULTI-TRIGGER BONUS," U.S. patent application Ser. No. 13/430,196.

BACKGROUND

Various different types of gaming devices are generally known. The primary or base games of conventional gaming devices award players for achieving winning combinations of symbols, cards, etc. In addition, certain gaming devices have secondary or bonus games associated with the primary or base game. The secondary or bonus game generally begins after the occurrence of a triggering event or predetermined condition in the primary or base game. An example of such a triggering event is the displaying of three "7" symbols on a set of reels in a slot machine game, which causes the initiation of a bonus game. In another example, such as a video poker game, the triggering event may be a card combination such as a flush or a straight.

Gaming devices generally have one primary or base game and one or more secondary or bonus games. Achieving one of the triggering events in the primary or base game generally leads to receiving a bonus award through the designated bonus game associated with the triggering event.

Other known gaming devices simultaneously display two primary or base games. The games may be played dependently or independently; however, known gaming devices do not provide a player with a secondary or bonus game based on achieving a triggering event in both primary or base games. To maintain player interest, it is desirable to provide a gaming device that provides an opportunity to win an increased amount by achieving a triggering event in the same play of at least two primary or base games in a gaming device which triggers a separate and unique secondary or bonus game or award opportunity.

SUMMARY

The present invention provides a gaming device which includes first and second primary or base games. In one embodiment, each game is played independently of the other game but activated or wagered upon at the same time. In another embodiment, the games are played simultaneously. In other embodiments, the games are played sequentially, but activated in the same play, such as by the player making one wager on both games or individual wagers on the games in the same play. In one embodiment, each game has one or more predetermined conditions or triggering events, upon the occurrence of which, a secondary or bonus game or award opportunity is provided to the player. If a predetermined condition or triggering event occurs in the same play of each of the games, the player receives a multi-trigger bonus such as a jackpot bonus, or other special bonus game or award opportunity different from that triggered if a triggering event occurs in only one of the games. The first and second games may or may not be the same type of game and may or may not have identical predetermined conditions or triggering events.

In one embodiment, the gaming device has two display devices. A first display device displays a first game. The game may be a slot-type game, blackjack, video poker, or other game. A second display device displays a second game. The second game may also be a slot-type game, blackjack, video poker, or other game and may be the same as or different from the first game. A player plays both games independently of or dependent on the other, and each game has one or more predetermined conditions or triggering events.

For example, the first display device may display the first game, which is a slot-type game having three reels. A triggering event for this game is three identical symbols along a payline. The second display device shows the second game, which is a video poker game with a triggering event being a flush. If a player plays both games and achieves a triggering event in the same play in both games, the gaming device awards the player a multi-trigger bonus.

It is therefore an advantage of the present invention to provide a gaming device having multiple primary or base games and a multi-trigger bonus.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION

Gaming Device and Electronics

Figure 1A:
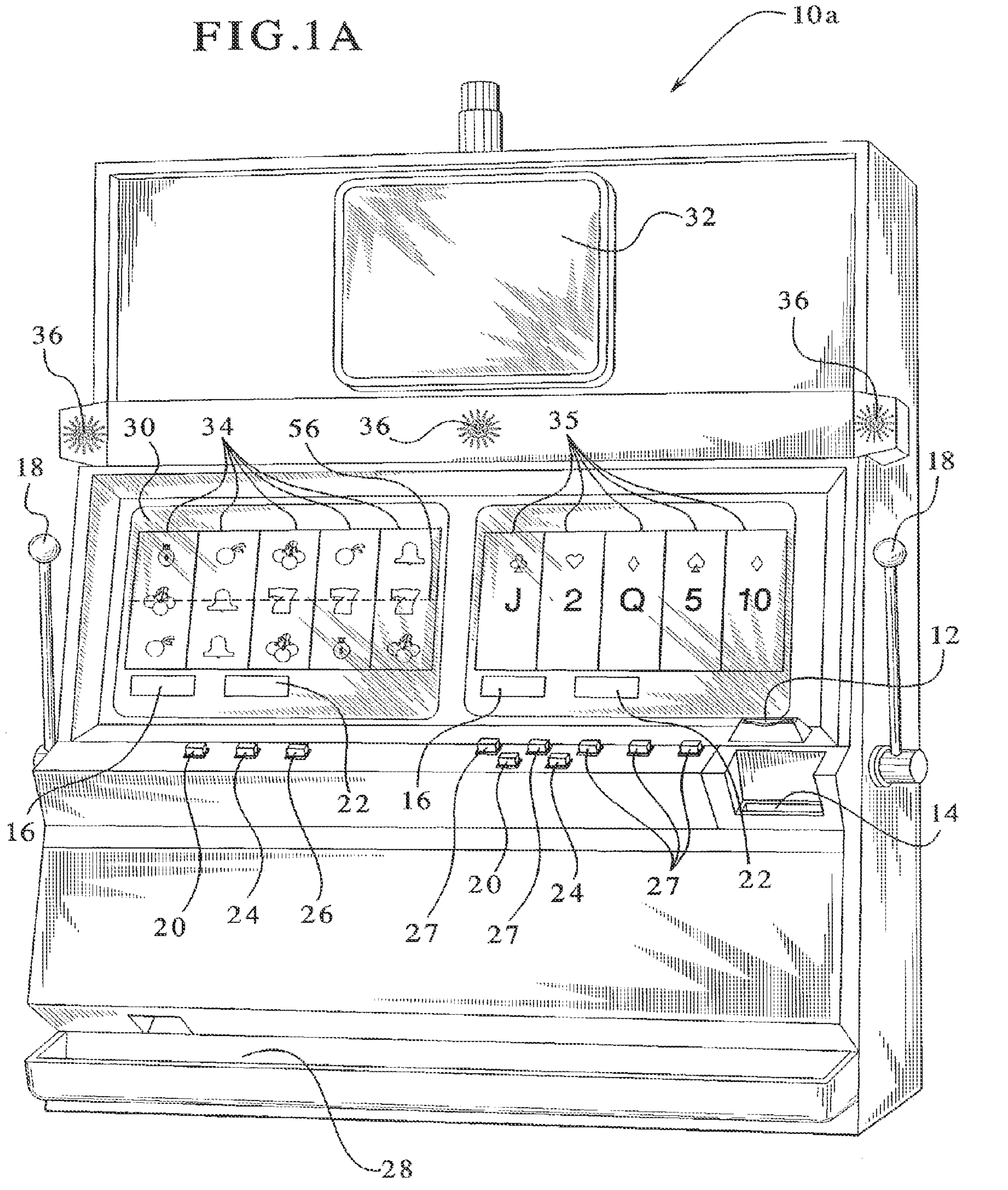
FIGS. 1A, 1B and 1C are perspective views of alternative embodiments of the gaming device of the present invention.
Figure 1B:
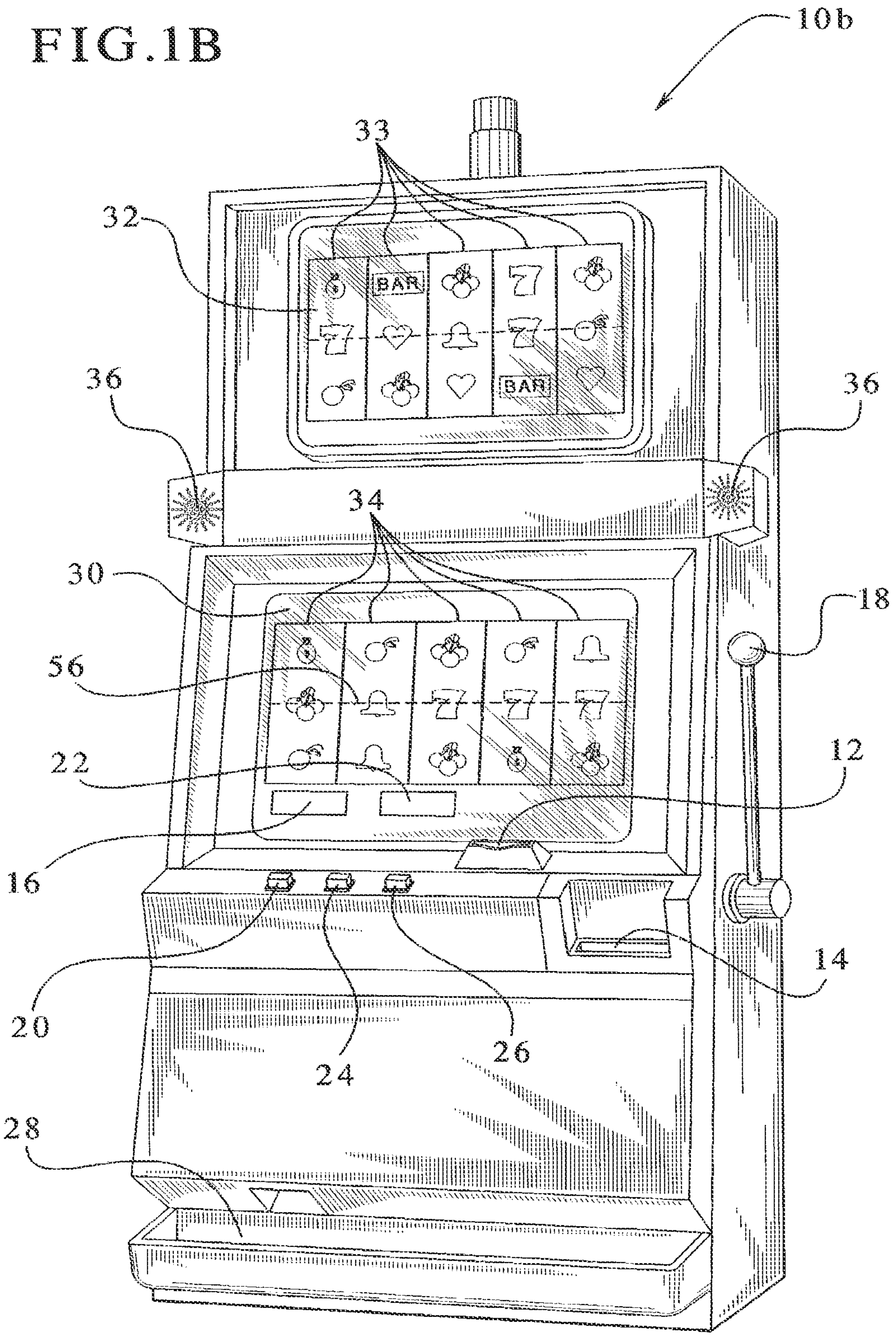
Figure 1C:
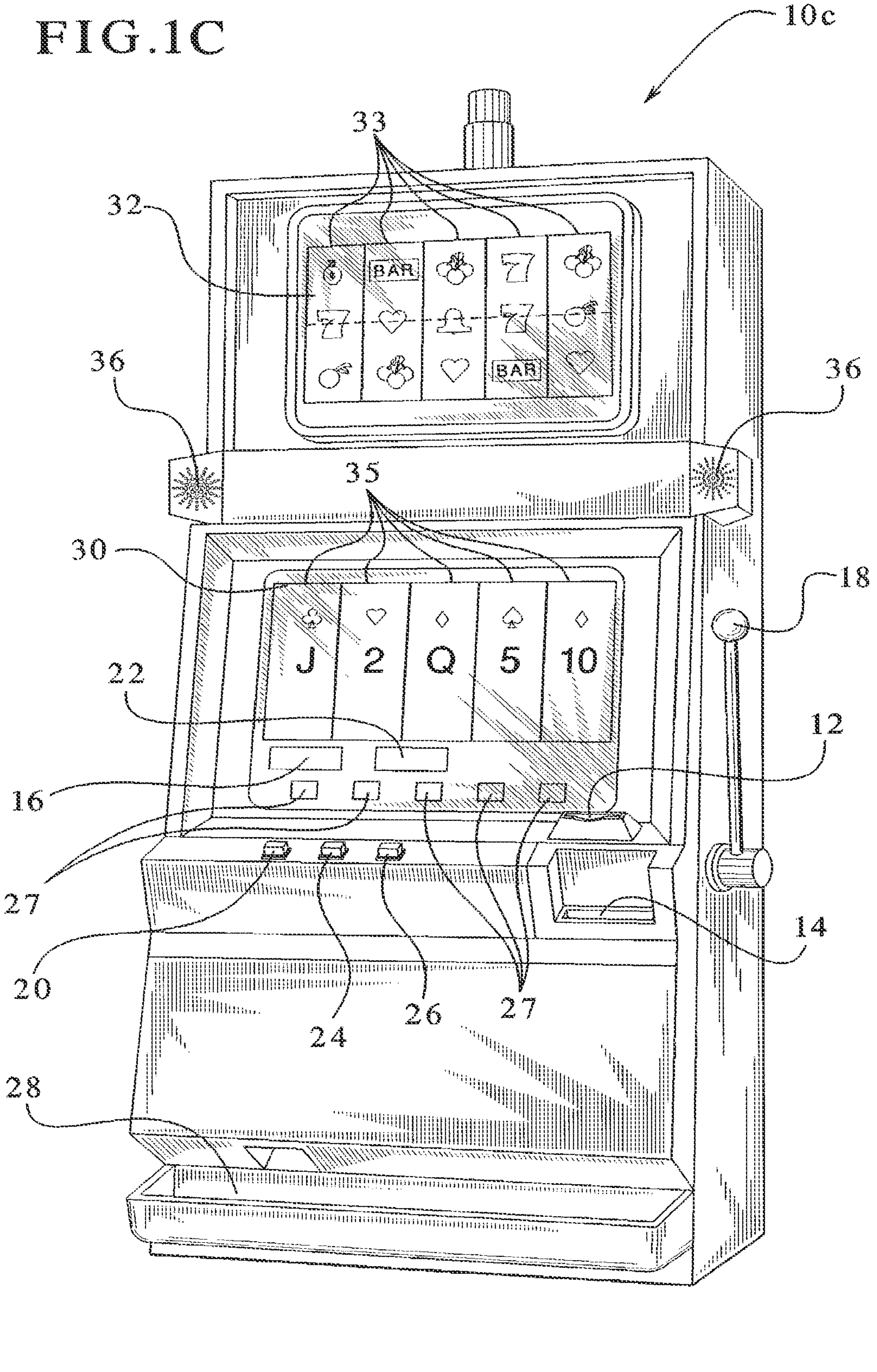

Referring now to the drawings, and in particular to FIGS. 1A, 1B and 1C, gaming device 10*a*, gaming device 10*b* and gaming device 10*c* illustrate three possible cabinet styles and display arrangements and are collectively referred to herein as gaming device 10. The present invention includes gaming device 10 that contains at least two base games being stand alone games. For illustration purposes only, gaming device 10 displays two base games. A base game in gaming device 10 can be a slot machine having the controls, displays and features of a conventional slot machine, a video card game such as poker, blackjack, etc., having the controls, displays and features of a conventional video poker machine, or other game suitable for placement in gaming device 10. The two base games may be the same game or any combination of possible games. The player can operate the gaming device 10 while standing or sitting. Gaming device 10 also includes being a pub-style or table-top game (not shown), which a player operates while sitting.

Furthermore, gaming device 10 can be constructed with varying cabinet and display designs, as illustrated by the designs shown in FIGS. 1A, 1B and 1C. For example, the base games may be displayed together on a single display device or on separate display devices. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 also embodies any bonus games or progressive games coordinating with the base games. The symbols and indicia used for any of the base, bonus and progressive games include mechanical, electrical or video symbols and indicia.

In a stand alone or a bonus embodiment, gaming device 10 includes monetary input devices. FIGS. 1A, 1B and 1C illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin either game by pulling arm 18 or pushing play button 20. Play button 20 can be any play activator used by the player which starts any game or sequence of events in the gaming device.

As shown in FIGS. 1A, 1B and 1C, gaming device 10 also includes a bet display 22 and a bet one button 24. The player places a bet on one of the base games by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. It should be appreciated that each base game could have its own bet display 22 and bet one button 24 as illustrated in FIG. 1A or that a player may use one bet display 22 and one bet one button 24 to place bets on all base games on gaming device 10 as illustrated in FIGS. 1B and 1C. A player may cash out by pushing a cash out button 26 to receive coins or tokens in the coin payout tray 28 or other forms of payment, such as an amount printed on a ticket or credited to a credit card, debit card or smart card.

Gaming device 10 also includes one or more display devices. The embodiment shown in FIG. 1A includes central display devices 30 and 31 and an upper display device 32, and the alternative embodiments shown in FIGS. 1B and 1C include a central display device 30 as well as an upper display device 32. The display devices display any visual representation or exhibition, including but not limited to movement of physical objects such as mechanical reels and wheels, dynamic lighting and video images. The display device includes any viewing surface such as glass, a video monitor or screen, a liquid crystal display or any other static or dynamic display mechanism.

A slot machine base game of gaming device 10 as shown in FIGS. 1A and 1B preferably displays a plurality of reels 34, preferably three to five reels 34, in mechanical or video form on one or more of the display devices. Each reel 34 displays a plurality of indicia such as bells, hearts, fruits, numbers, letters, bars or other images which preferably correspond to a theme associated with gaming device 10. If the reels 34 are in video form, the display device displaying the video reels 34 is preferably a video monitor.

Similarly, if a base game is card based such as video poker or blackjack, the display device is preferably a video monitor as shown in FIGS. 1A and 1C. The cards 35 are associated with one or more decks of cards used in conventional poker games. The cards 35 may further display a variety of images such as bells, hearts, fruits, numbers, letters or other images which may correspond to a theme associated with the gaming device 10. Furthermore, each gaming device 10 includes speakers 36 for making sounds or playing music.

Figure 2:
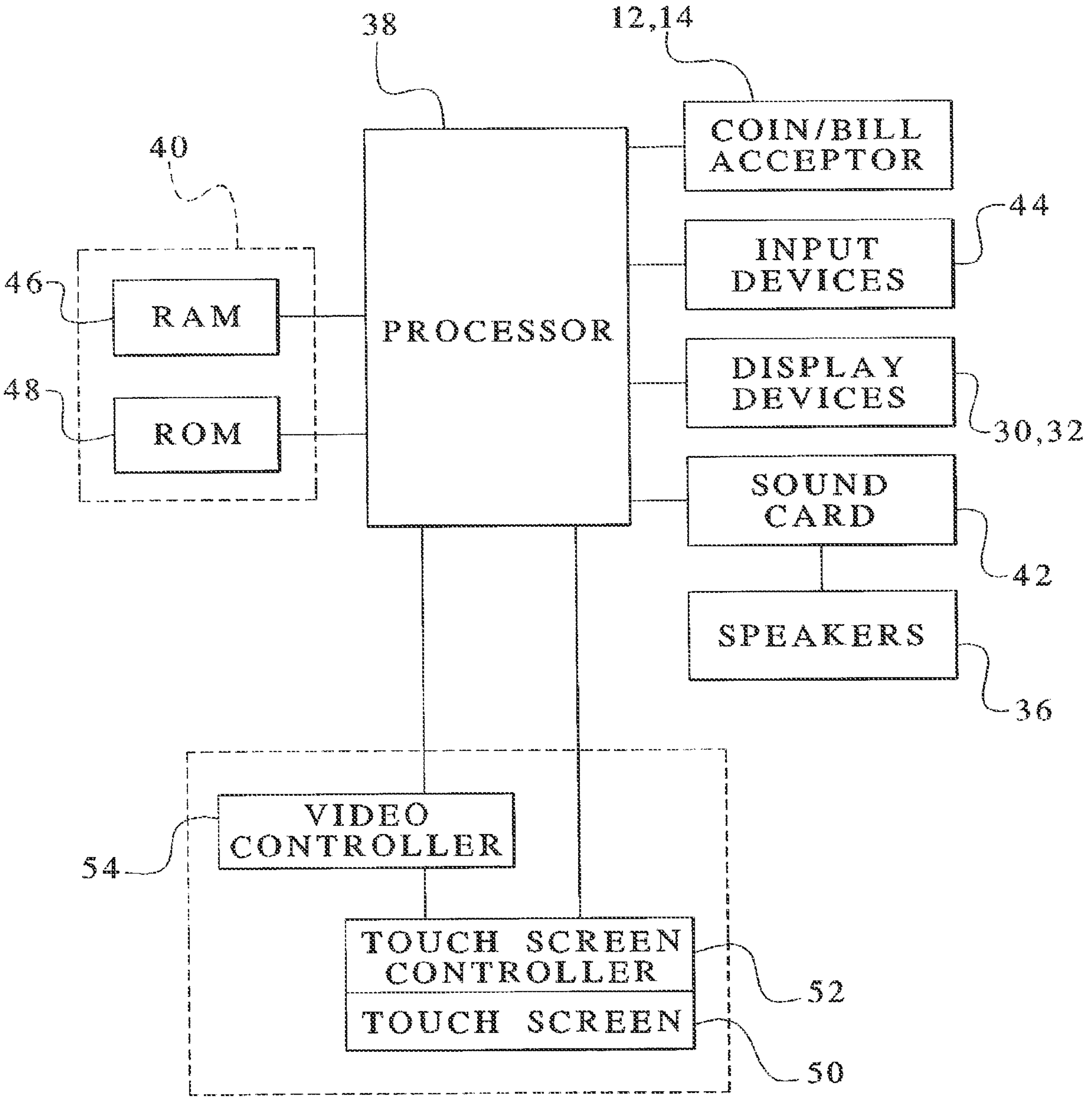
FIG. 2 is a schematic block diagram of the configuration of a system in an embodiment of the present invention.

Referring now to FIG. 2, a general electronic configuration of the gaming device 10 for the stand alone and bonus embodiments described above preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 includes random access memory (RAM) 46 for storing event data or other data generated or used during a particular game. The memory device 40 also includes read only memory (ROM) 48 for storing program code, which controls the gaming device 10 so that it plays a particular game in accordance with applicable game rules and pay tables.

As illustrated in FIG. 2, the player preferably uses the input devices 44 to input signals into gaming device 10. In a slot machine base game, the input devices 44 include the pull arm 18, play button 20, the bet one button 24 and the cash out button 26. In a video poker or blackjack base game, the input devices 44 include the play button 20, the bet one button 24, the hold buttons 27 and the cash out button 18 to input signals into gaming device 10. A touch screen 50 and touch screen controller 52 are connected to a video controller 54 and processor 38. The terms “computer” or “controller” are used herein to refer collectively to the processor 38, the memory device 40, the sound card 42, the touch screen controller and the video controller 54.

In certain instances, it is preferable to use a touch screen 50 and an associated touch screen controller 52 instead of a conventional video monitor display device. The touch screen enables a player to input decisions into the gaming device 10 by sending a discrete signal based on the area of the touch screen 50 that the player touches or presses. As further illustrated in FIG. 2, the processor 38 connects to the coin slot 12 or payment acceptor 14, whereby the processor 38 requires a player to deposit a certain amount of money in to start the game.

It should be appreciated that although a processor 38 and memory device 40 are preferable implementations of the present invention, the present invention also includes being implemented via one or more application-specific integrated circuits (ASIC’s), one or more hard-wired devices, or one or more mechanical devices (collectively or alternatively referred to herein as a "processor"). Furthermore, although the processor 38 and memory device 40 preferably reside in each gaming device 10 unit, the present invention includes providing some or all of their functions at a central location such as a network server for communication to a playing station such as over a data network such as a local area network (LAN), wide area network (WAN), Internet connection, microwave link, and the like.

Primary or Base Games

The present invention provides a player with different entertainment than existing devices because it provides the opportunity of larger jackpots and awards in the form of a multi-trigger bonus. The present invention does this by providing two or more primary or base games for the player to play. Each primary or base game alone can entertain the player through providing the player awards upon the occurrence of triggering events, as is done on existing devices. However, when two or more primary or base games are played, it is unlikely that triggering events would occur in the same play of two or more primary or base games. Because of the smaller likelihood of multiple triggering events occurring in the same play of two separate or independent games, the present invention allows for a relatively larger bonus award or award opportunity referred to herein as the multi-trigger bonus, upon the occurrence of multiple triggering events in the same play of multiple primary or base games.

In one embodiment, a slot-type game is a primary or base game in gaming device 10. With reference to the slot machine primary or base games of FIGS. 1A, 1B and 1C, to operate the gaming device 10, the player inserts the appropriate amount of tokens or money in the coin slot 12 or the payment acceptor 14 and then pulls the arm 18 or pushes the play button 20. The reels 34 then begin to spin. Eventually, the reels 34 come to a stop. As long as the player has credits remaining, the player can spin the reels 34 again. Depending upon where the reels 34 stop, the player may or may not win additional credits.

In another embodiment, a video poker game is a primary or base game in gaming device 10. With reference to FIGS. 1A and 1C, to operate gaming device 10 in this embodiment the player must insert the appropriate amount of money or tokens at coin slot 12 or bill acceptor 14 and then push the deal button 20. Gaming device 10 allows the player to play a conventional game of video poker and initially deals five cards 35 all face up from a single fifty-two card deck. If the player wishes to draw, the player selects the cards 35 to hold by pressing related hold buttons 27 or the touch screen 50. The player then presses the deal button 20 and the unwanted cards 35 are removed from the display 30 and replacement cards 35 are dealt from the remaining cards in the deck. This results in a final five-card hand 35. The final five-card hand 35 is compared to a payout table which utilizes conventional poker hand rankings to determine the winning hands. The player is provided with an award based on a winning hand and the credits the player wagered. As long as the player has credits remaining, the player can continue to play additional poker games.

It should be appreciated that there may be additional variations of poker games such as a hand having a different number of cards or variations of conventional poker hand rankings which gaming device 10 can be adapted to play. It should also be appreciated that other card-based games such as blackjack could be used as a primary or base game.

In addition to winning primary or base game credits, gaming device 10, including any of the primary or base games disclosed above, also includes one or more secondary or bonus games or award opportunities that give players the opportunity to win credits or bonus awards. The secondary or bonus games or award opportunities may be embodied in many ways. For example, upon the occurrence of a triggering event in a primary or base game, the player may automatically win a bonus award or play a bonus game that gives the player the opportunity to win a bonus award. Also, a triggering event in a primary or base game may automatically cause the start of a bonus game that provides an opportunity for a bonus award for the player. For the purposes of this application any secondary or bonus games or award opportunities triggered by the occurrence of any triggering event in a primary or base game is referred to as a bonus award opportunity. The bonus award opportunity can be displayed on one or both central display devices 30 and 31 and/or upper display device 32. It should be appreciated that other embodiments of a bonus award opportunity may exist on the occurrence of a triggering event in a primary or base game.

For example, in the slot machine embodiment, a triggering event may include a particular symbol or symbol combination generated on a display device. As illustrated in the five reel slot game shown in FIGS. 1A and 1B, the triggering event includes the number "7" appearing on three adjacent reels 34 along a payline 56. It should be appreciated that the slot gaming device includes one or more paylines, such as payline 56, wherein the paylines can be horizontal, diagonal or any combination thereof. Thus, upon the occurrence of the triggering event as shown in FIG. 1A, the gaming device provides the player with a bonus award opportunity.

In another embodiment, the triggering event includes a particular card combination in a video poker or blackjack game. As illustrated in FIGS. 3C and 5C, a triggering event for a video poker base game may include a flush, a straight, or three Queens. It should be appreciated that the present invention includes as a triggering event any single card or combination of cards that can be displayed when playing video poker, blackjack or other card-based game. Similarly, upon the occurrence of the triggering event as shown in FIG. 3C, the gaming device provides the player with a bonus award opportunity.

Independent Base Games

This invention includes gaming device 10 where more than one primary or base game can be played. These primary or base games can be any game suitable for placement in gaming device 10. Further, the primary or base games may be operated separately as single games or simultaneously.

In one embodiment, the gaming device 10 has two display devices 30 and 32. The first or central display device 30 displays or provides a first primary or base game as illustrated in FIGS. 3A, 4A, 5A, 6A and 7A. The second or upper display device 32 displays or provides a second primary or base game, which is independent of the first primary or base game. The first and second primary or base games each may be any suitable type of game. Moreover, the first and second primary or base games may have any suitable type of display, whether mechanical or video, for the type of game.

The primary or base games may be operated separately or simultaneously. Each primary or base game has at least one triggering event that provides a player with a bonus award opportunity associated with that game and triggering event. When a triggering event in a primary or base game occurs, the gaming device provides the player with a bonus award opportunity. If both primary or base games are played and at least two triggering events occur in the same play, a multi-trigger bonus is triggered and provided to the player.

Triggering Events in the Same Play

Triggering events can occur in the same play in different ways. The present invention provides a multi-trigger bonus when multiple triggering events occur on the gaming device. The occurrence of multiple triggering events in the same play can include several situations such as operation of primary or base games consecutively or simultaneously, a bet on each game prior to play, separate bets on consecutive games that achieve triggering events, or other events that lead to the occurrence of multiple triggering events on gaming device 10.

In one embodiment, the player places bets on both primary games. Then, on a single play of the first primary game, a triggering event occurs. Next, on a single play of the second primary game, a triggering event occurs in that second primary game. The single plays of the two primary games could have occurred consecutively, where one primary game is played to completion before the other primary game is played, or the single plays could have occurred simultaneously where both primary games have begun to be played before one primary game has concluded. The gaming device provides the multi-trigger bonus to the player because at least one triggering event occurred in each of the two primary games in the same play, whether consecutively or simultaneously.

In other embodiments, multiple triggering events can occur in the same play to trigger the award of a multi-trigger bonus where bets are not placed on all primary games prior to play. In one embodiment, the gaming device enables a player to bet on and play one primary game to completion before betting on and playing the other primary game. Should one or more triggering events occur in the primary game played by the player, the gaming device enables the player to bet on and play the other primary game one or more times. If one or more triggering events occur in the other primary game during the predetermined number of times, the triggering events of the different primary games are considered to have occurred in the same play. Thus, the gaming device would provide a multi-trigger bonus to the player.

Figure 3A:
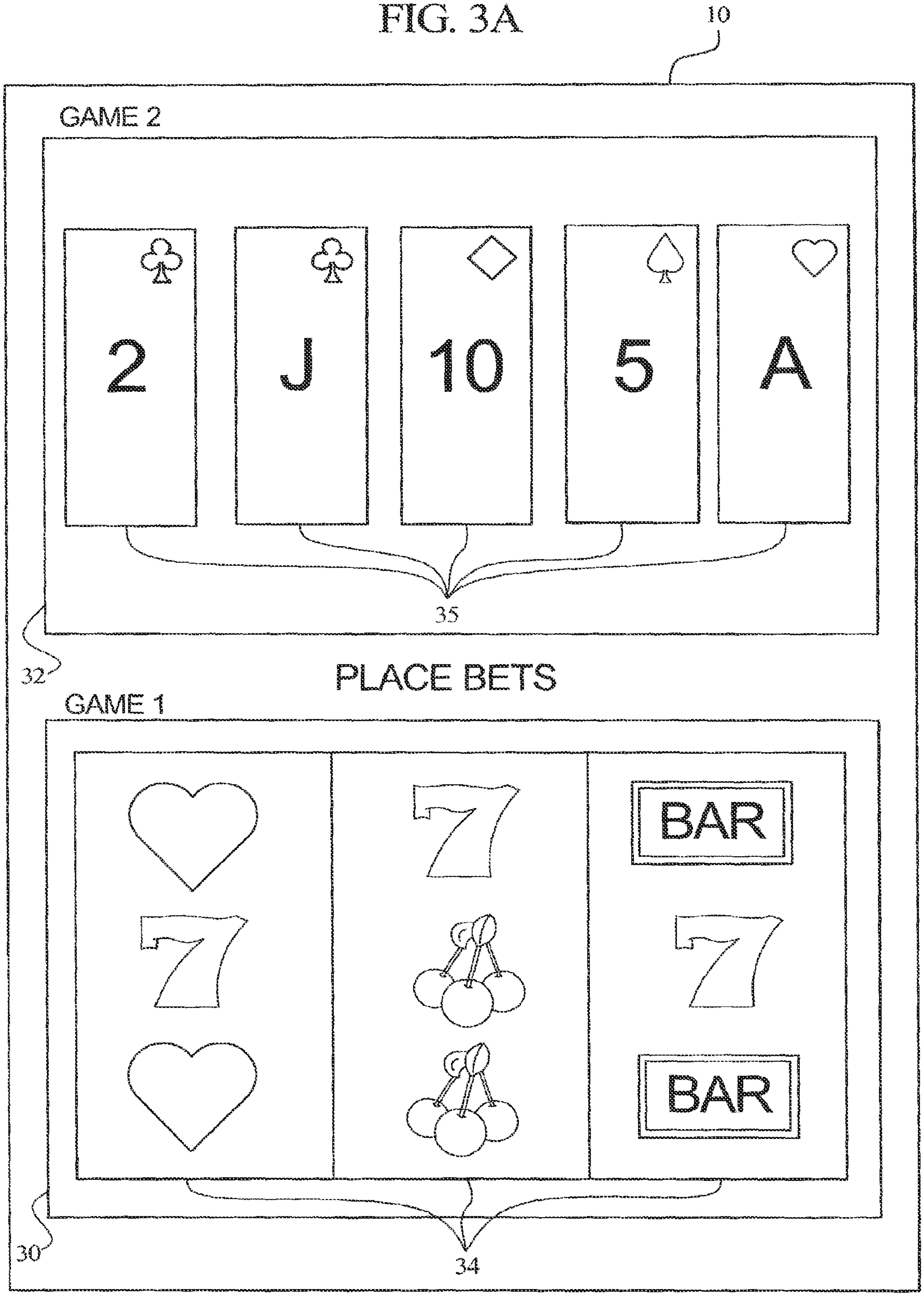
FIGS. 3A, 3B and 3C are front plan views of a gaming device having two display devices displaying two games played consecutively in the same play.
Figure 3B:
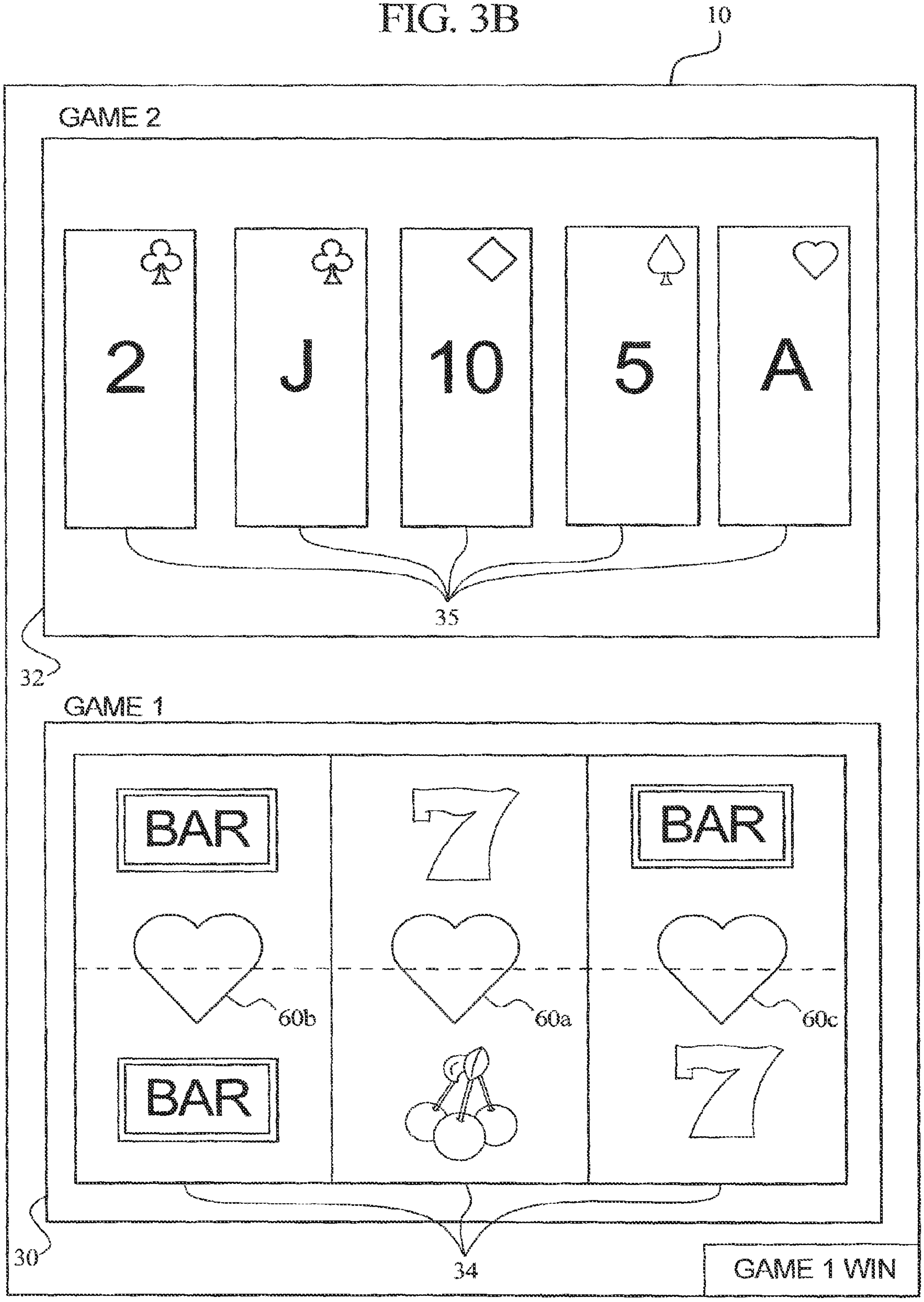
Figure 3C:
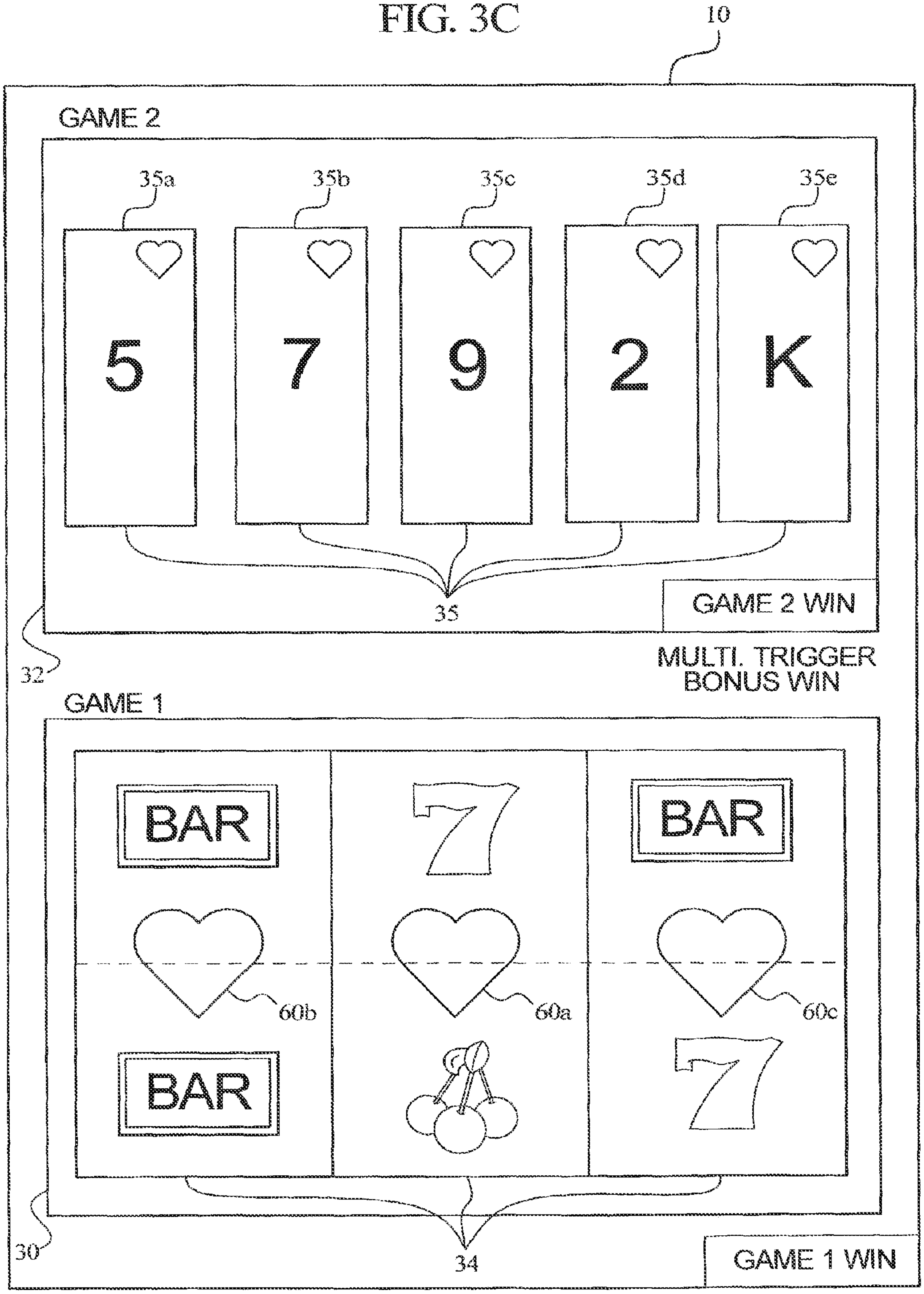

One example of the occurrence of a multi-trigger bonus by playing the primary games consecutively is illustrated in FIGS. 3A, 3B and 3C. The first primary game is operated within a first display device 30 which is a slot-type game as illustrated in FIG. 3A. Three identical symbols 60*a*, 60*b* and 60*c* occur along a payline 56 as illustrated in FIG. 3B. This is a triggering event for the slot game in display 30. After receiving the first triggering event, the second primary game is operated within a second display device 32 which is a video poker game. The gaming device deals the player a set of cards 35*a* through 35*e*. The cards constitute a flush, which is a triggering event for the video poker game in display 32 as illustrated in FIG. 3C. As a result, the gaming device provides the player with a multi-trigger bonus for the occurrence of triggering events in both primary games in the same play. It should be appreciated that the second primary game could have been operated before the first primary game to achieve triggering events in both games in the same play.

Figure 4A:
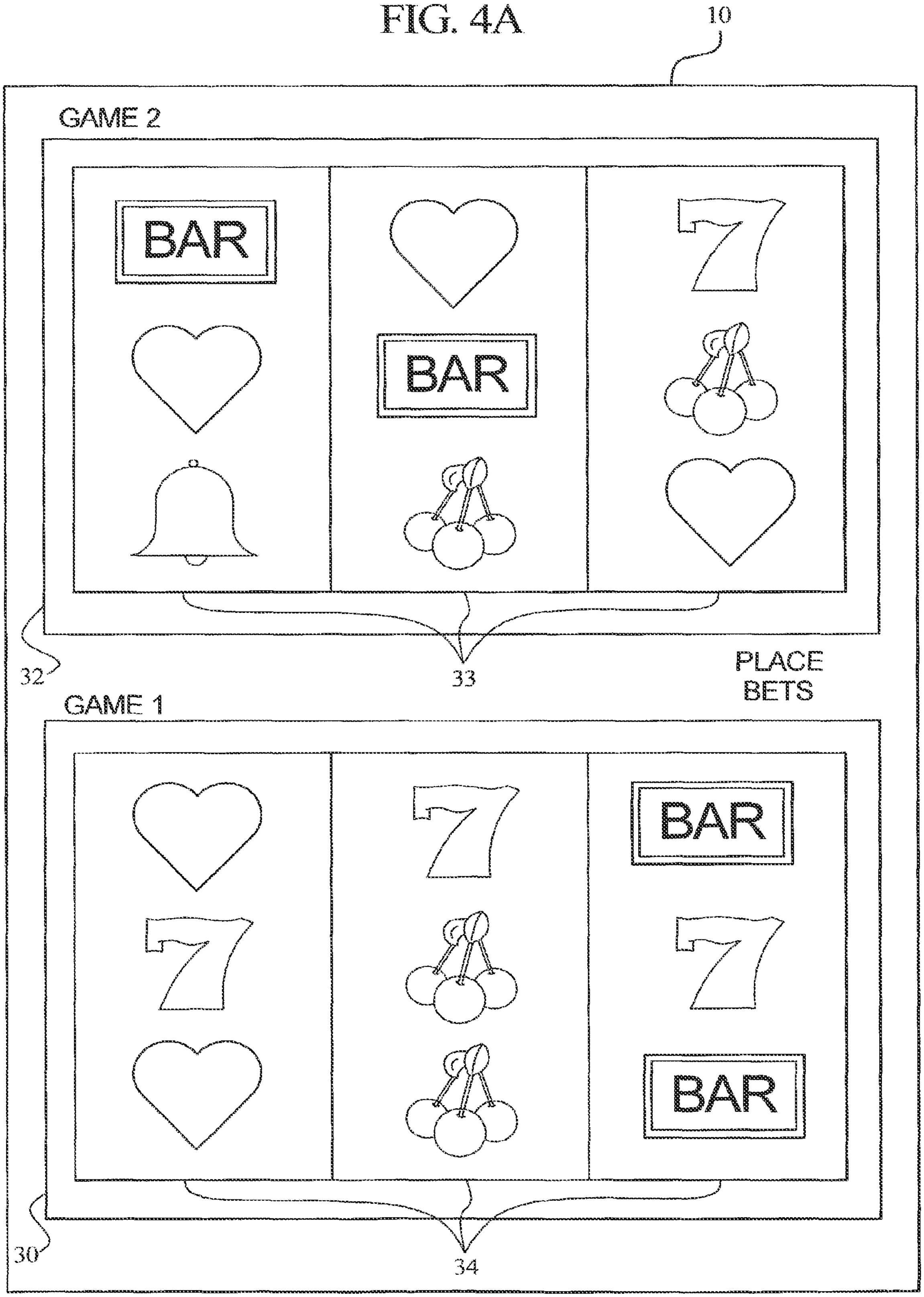
FIGS. 4A and 4B are front plan views of a gaming device having two display devices displaying two games played simultaneously in the same play.
Figure 4B:
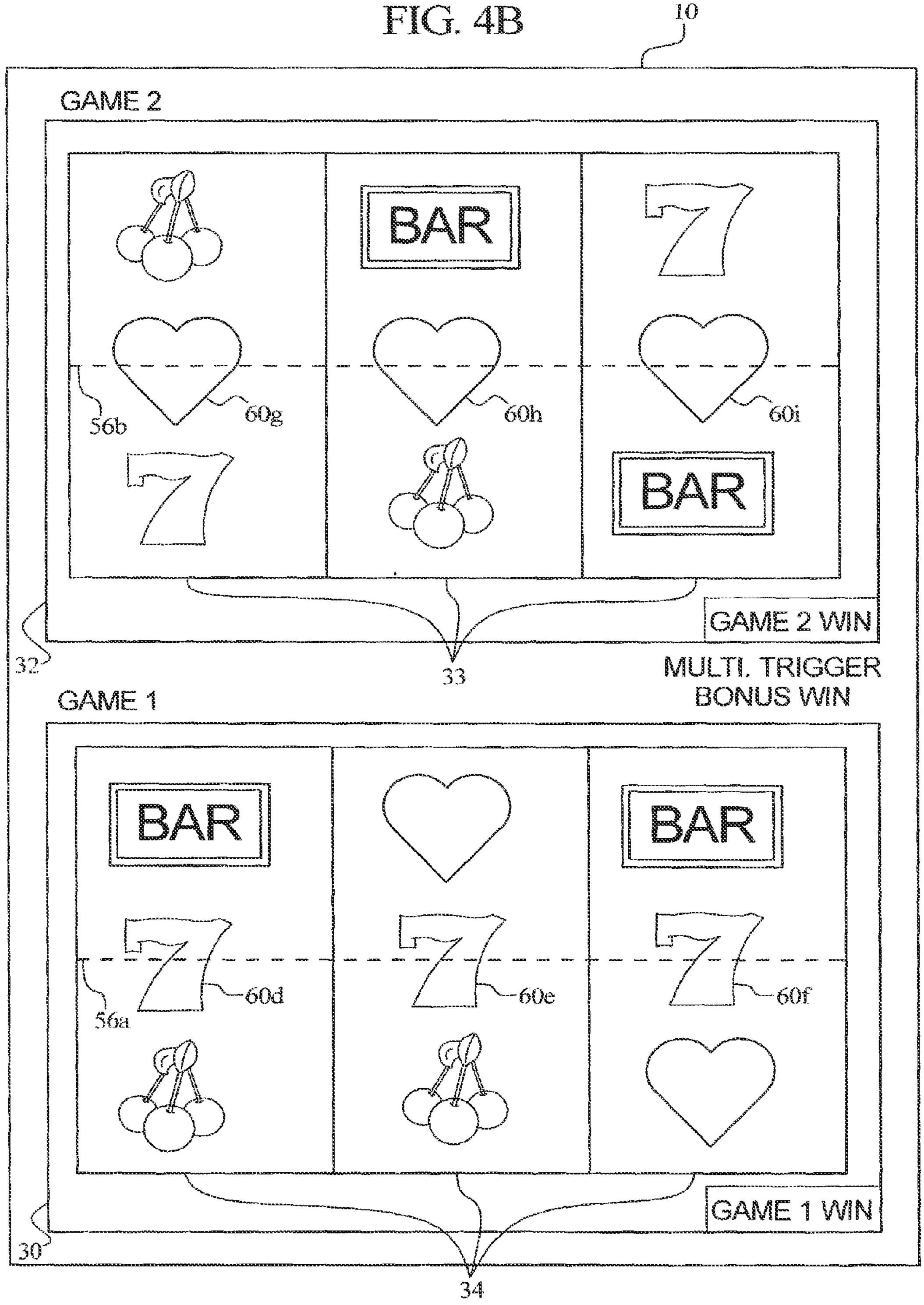

An illustration of the occurrence of a multi-trigger bonus by playing the primary games simultaneously is as follows. In this embodiment, both games are slot-type games as illustrated in FIGS. 4A and 4B. A first primary game has a first triggering event, which is three "7" symbols 60*d* through 60*f* along a payline 56*a*. The second primary game has a second triggering event, which is three heart symbols 60*g* through 60*i* along a payline 56*b*. The control features of the gaming device are used to spin both sets of reels 33 and 34 simultaneously. When the reels 33 and 34 stop spinning, both the first and second triggering events occur in the same play as illustrated in FIG. 4B. The gaming device then provides a multi-trigger bonus to the player. It should be appreciated that more than two games can be provided, each with a separate triggering event. In one embodiment, the respective triggering event needs to occur in each game to trigger the multi-trigger bonus. In another embodiment, the respective triggering events need to occur in at least two of the games (but not necessarily in all of the games) to trigger the multi-trigger bonus.

In another embodiment, the first display device 30 and the second display device 32 both display video poker games as illustrated in FIGS. 5A through 5C and 6A through 6E. The primary games may be operated simultaneously or consecutively. The first primary game includes a set of cards 35*f* through 35*j* and has a first triggering event, which is three Queens. The second primary game includes a set of cards 35*k* through 35*o* and has a second triggering event, which is a straight.

Figure 5A:
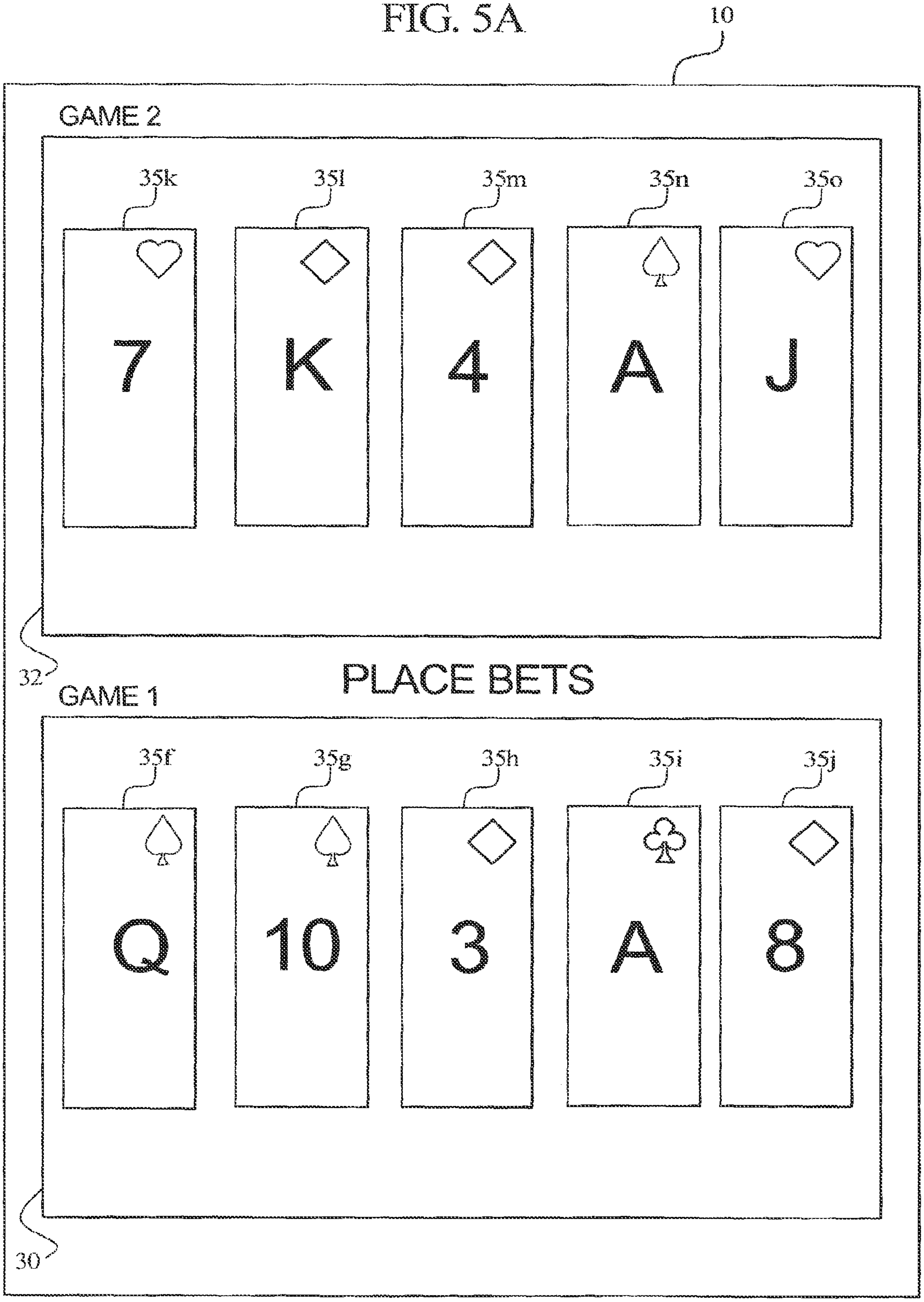
FIGS. 5A, 5B and 5C are front plan views of a gaming device having two display devices displaying two games played simultaneously in the same play.
Figure 5B:
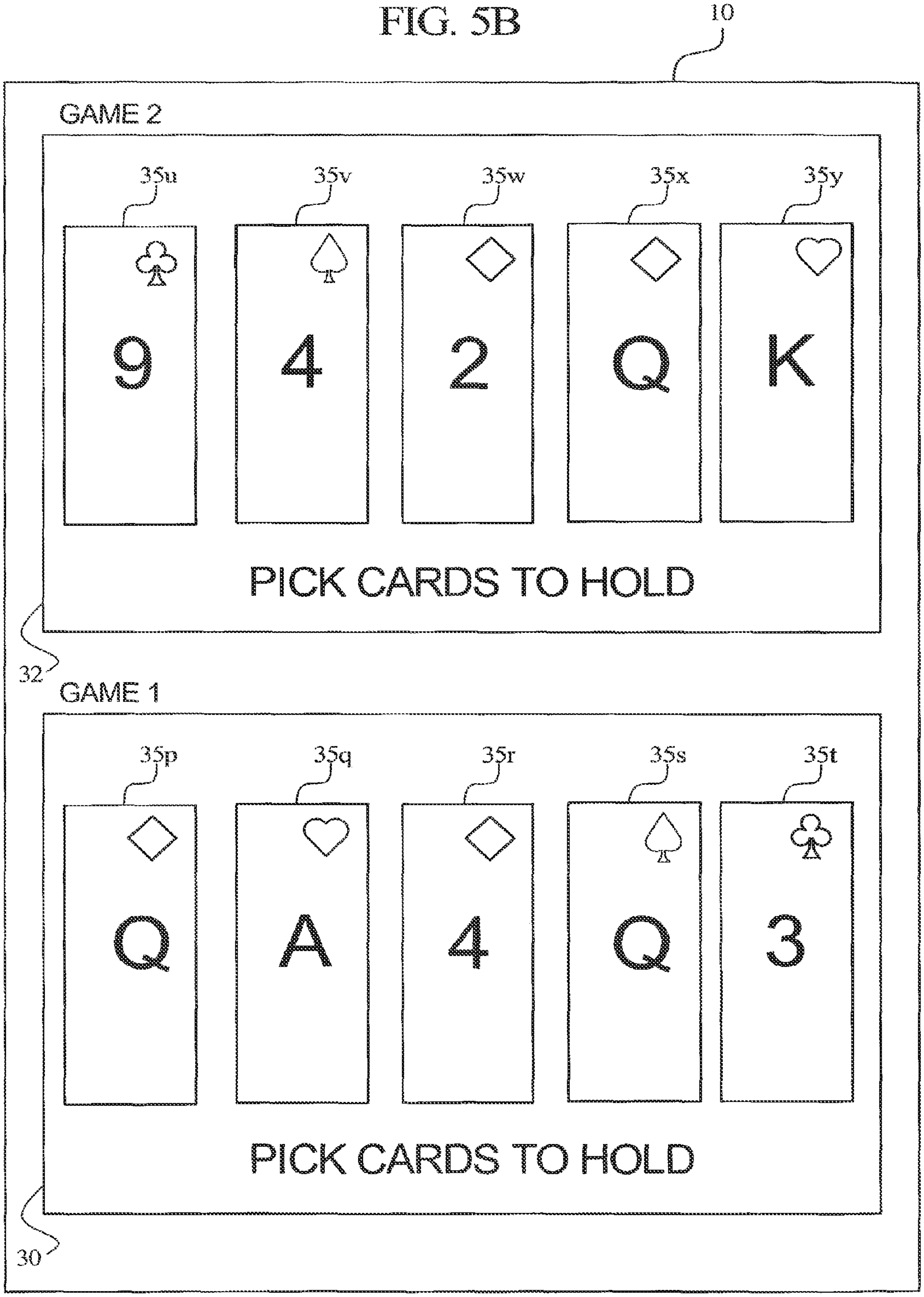
Figure 5C:
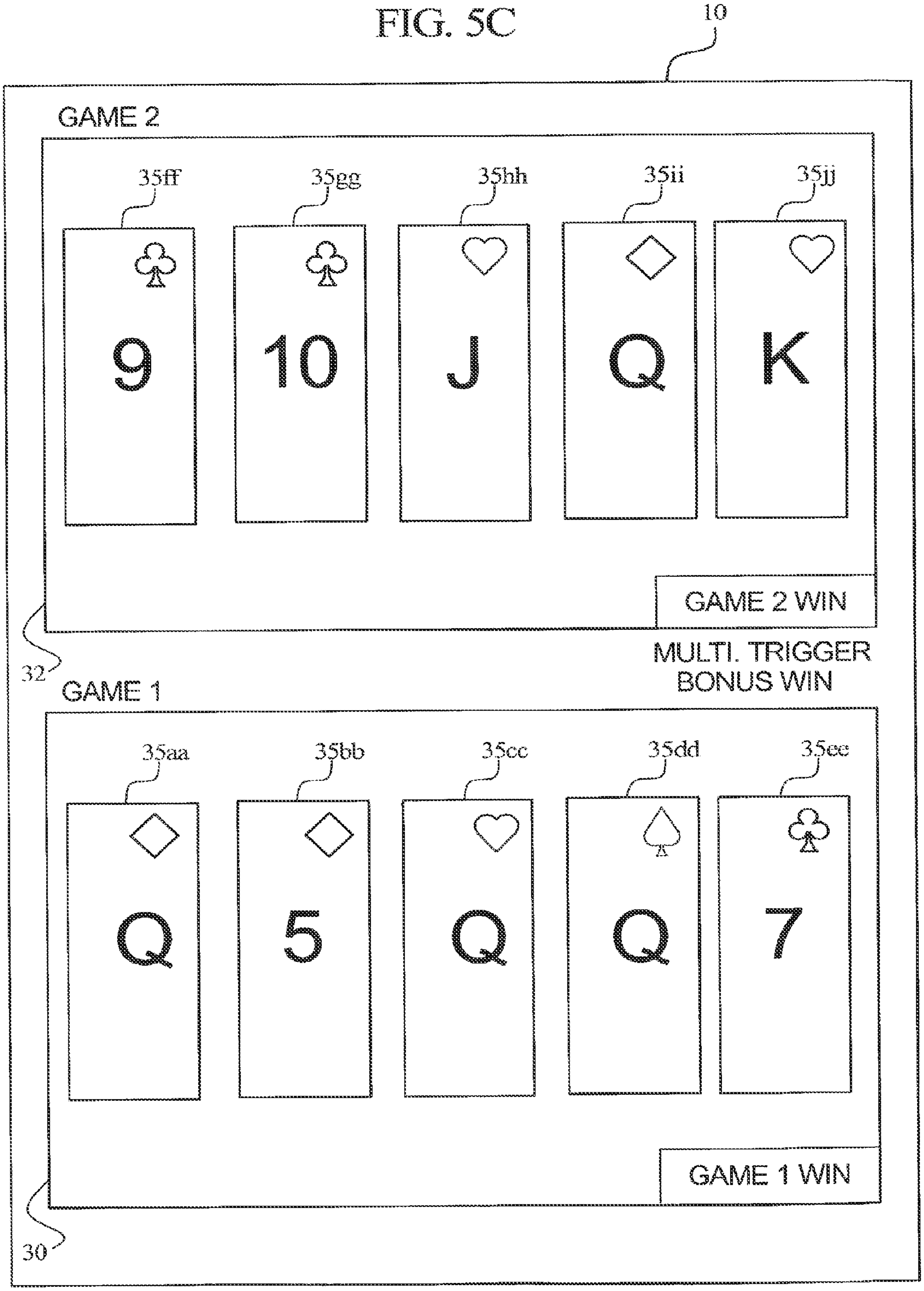

The player may play both primary games by selecting the cards to hold and deal on each game simultaneously as illustrated in FIGS. 5A through 5C. First, bets are placed on both primary games. Then gaming device 10 deals five cards 35*p* through 35*t* and 35*u* through 35*y* in each primary game as illustrated in FIG. 5B. The player chooses which cards to hold in each primary game, and gaming device 10 deals cards that result in final hands 35*aa* through 35*ee* and 35*ff* through 35*jj* as illustrated in FIG. 5C. The first primary game has three Queens, and the second primary game has a straight. Thus, gaming device 10 provides a multi-trigger bonus to the player.

Figure 6A:
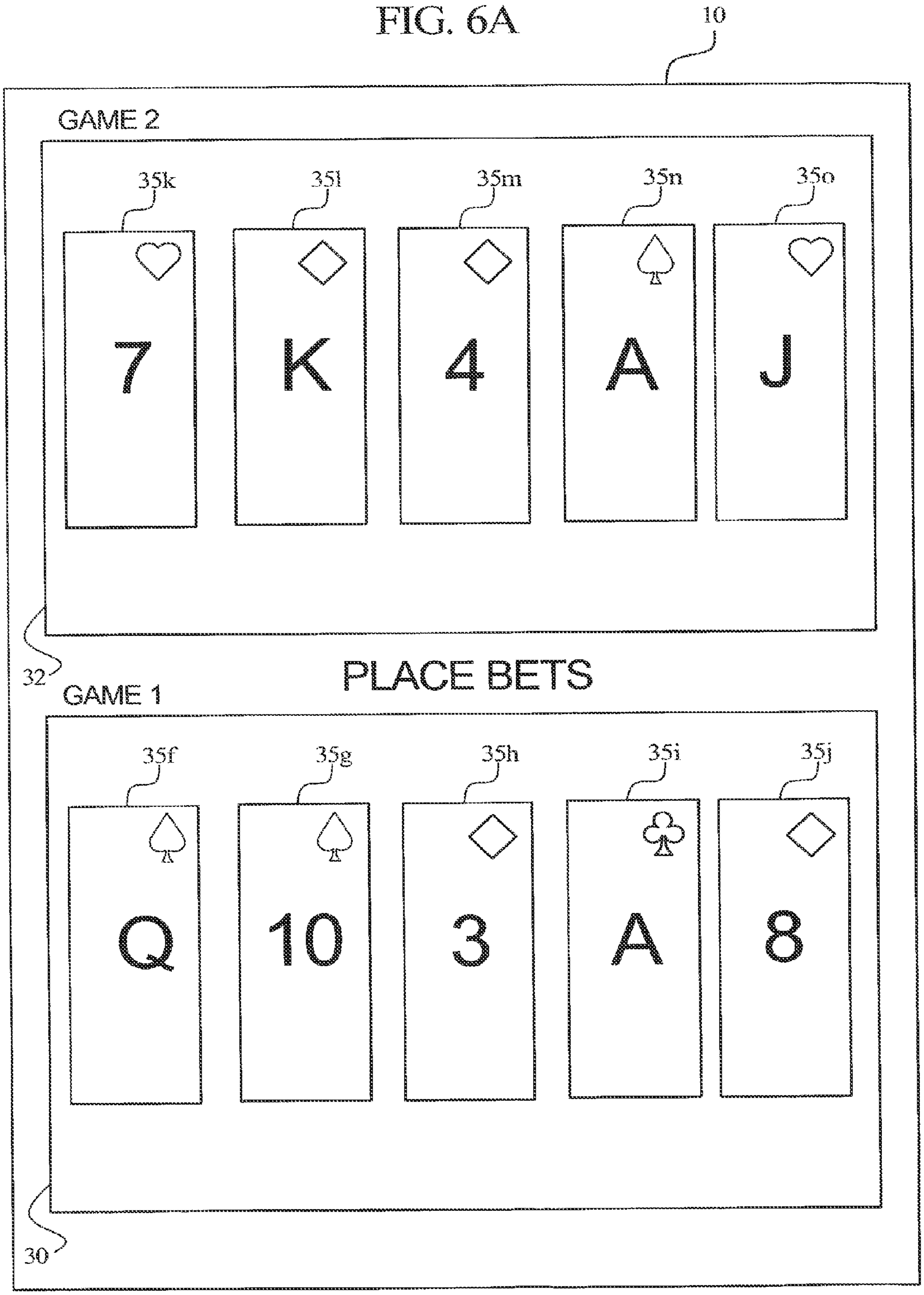
FIGS. 6A, 6B, 6C, 6D and 6E are front plan views of a gaming device having two display devices displaying two games played consecutively in the same play.
Figure 6B:
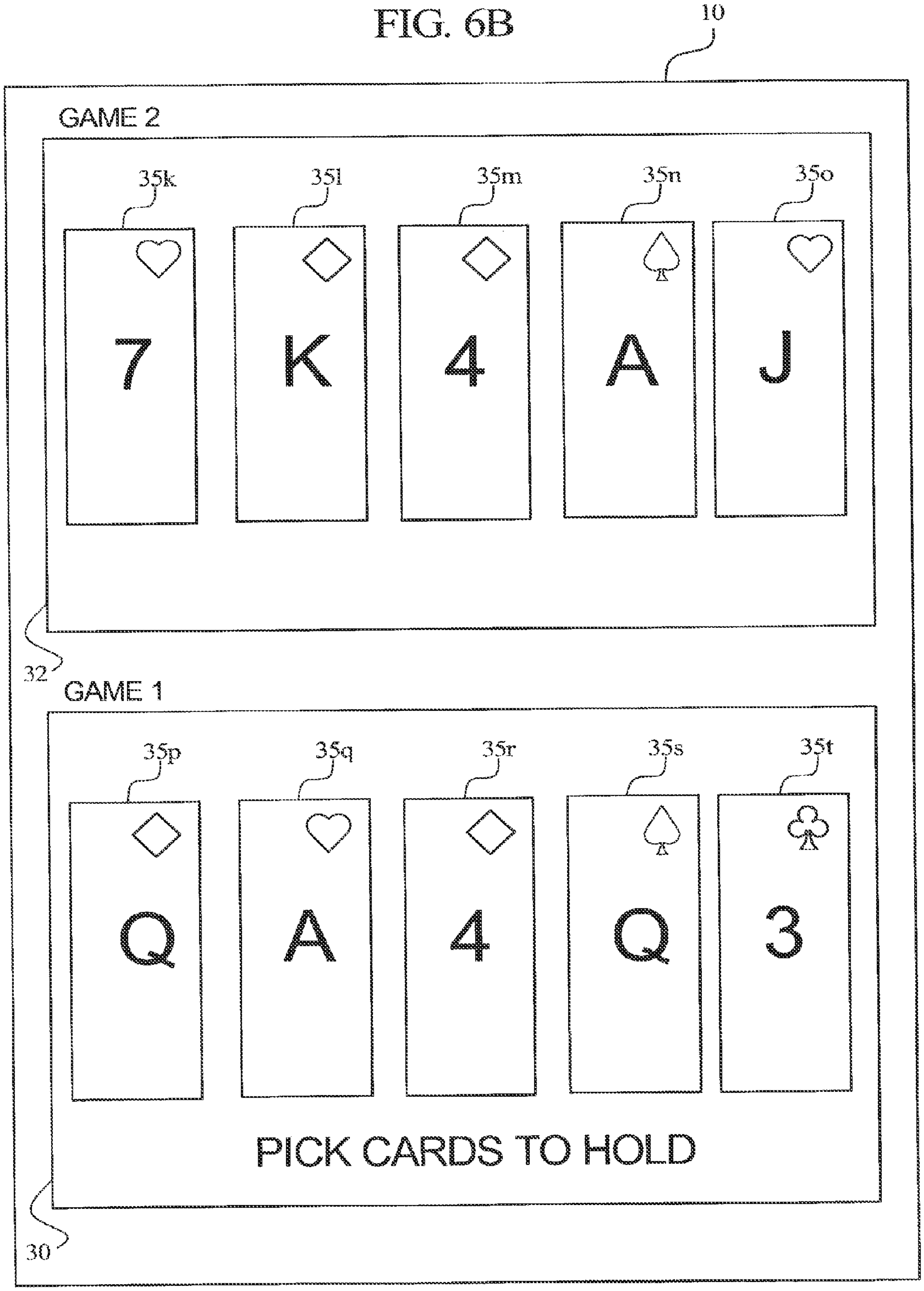
Figure 6C:
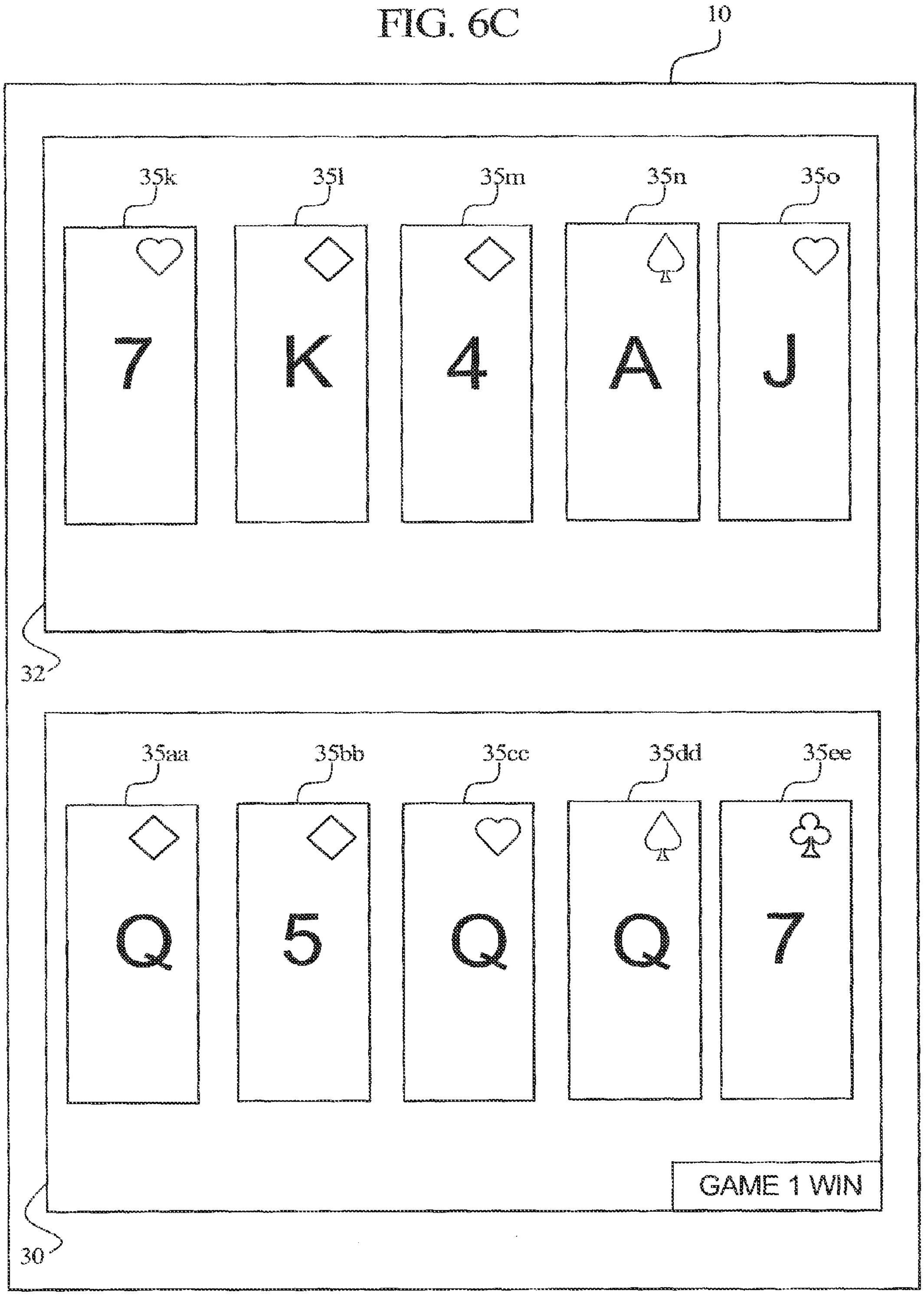
Figure 6D:
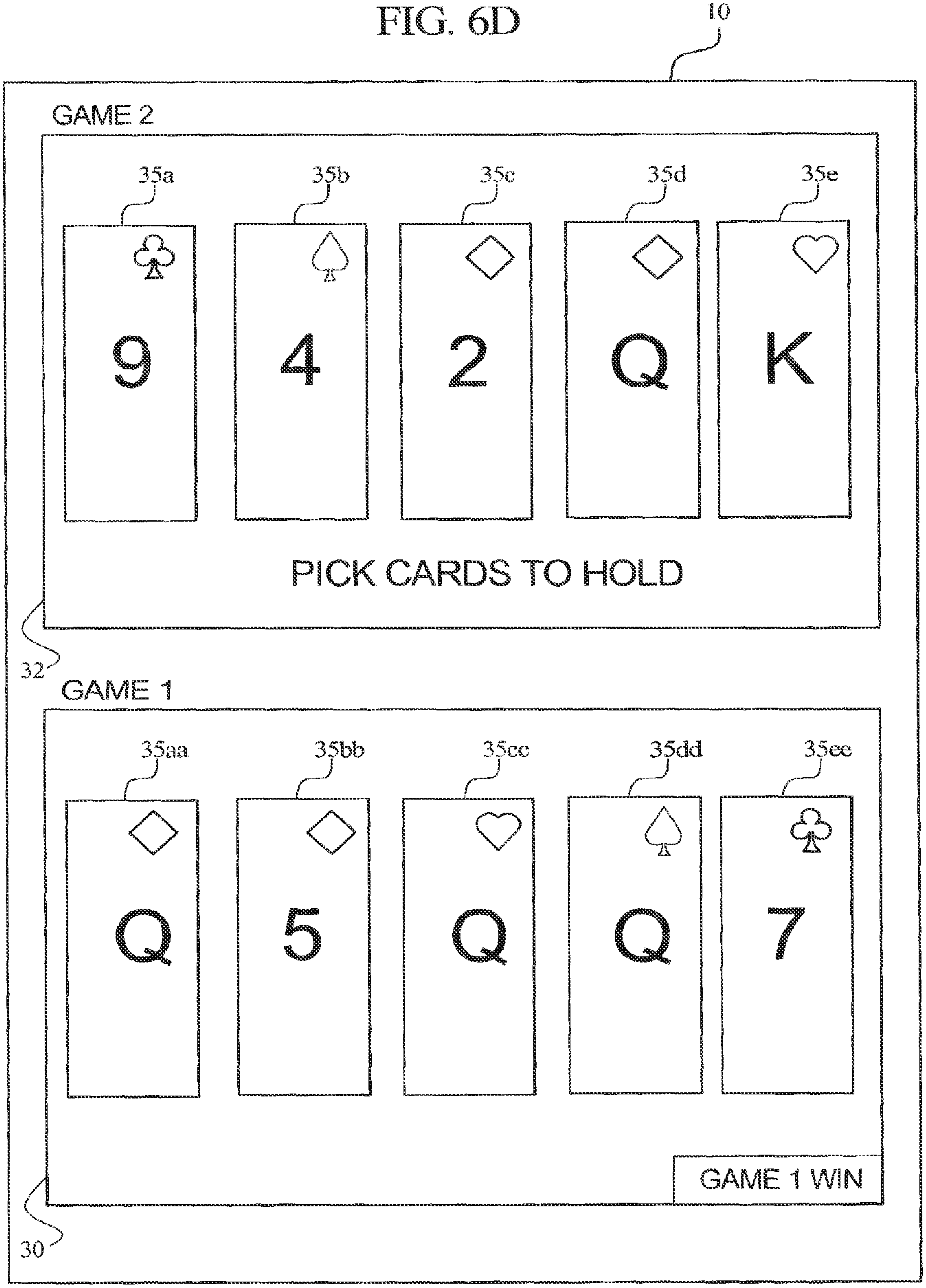
Figure 6E:
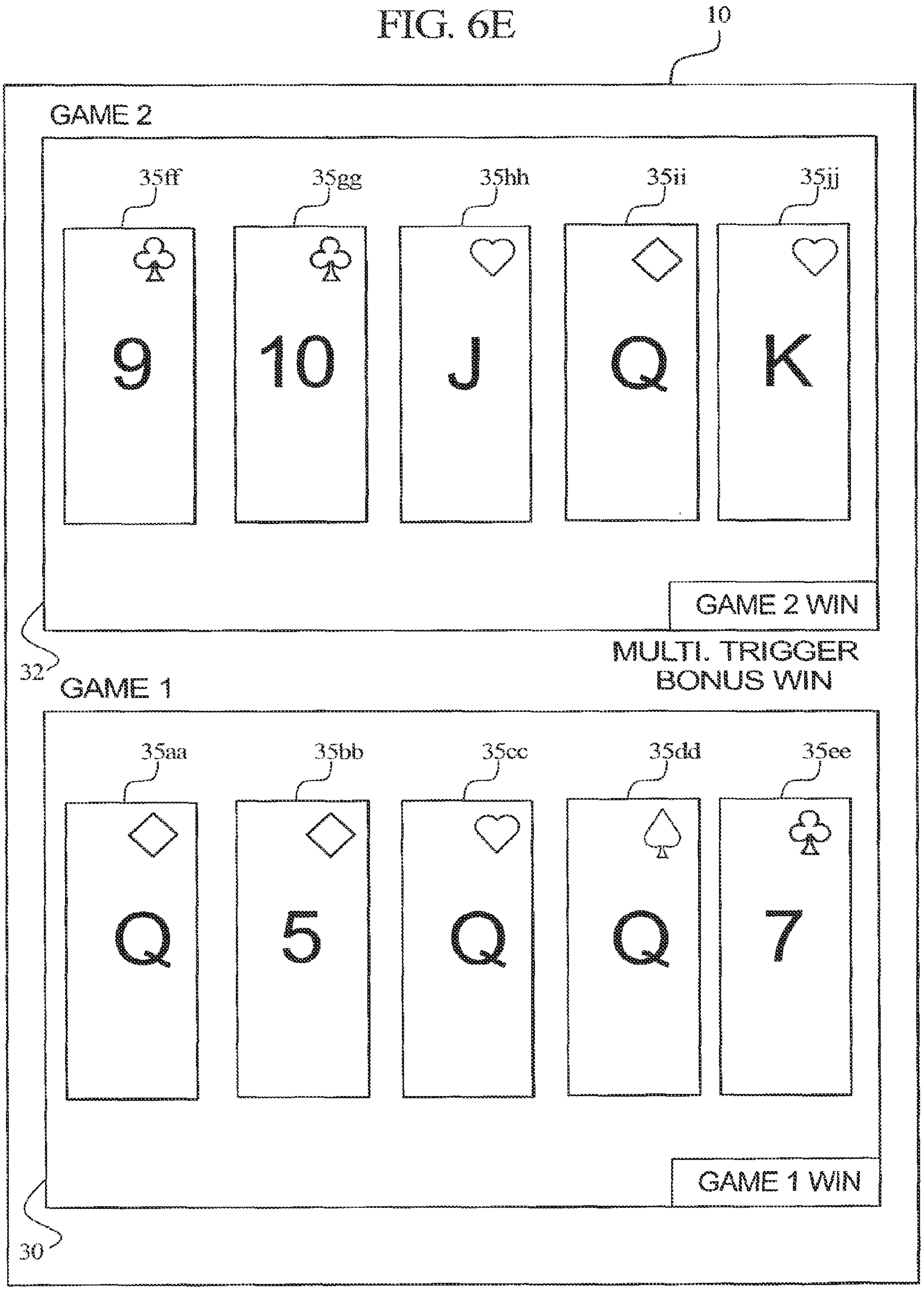

In another example, the primary games can be played consecutively as illustrated in FIGS. 6A through 6E. In this example, both primary games are bet on prior to play. Then, the first primary game is played as illustrated in FIG. 6B, and three Queens occur as illustrated in FIG. 6C. Next, the second primary game is played as illustrated in FIG. 6D, and a straight occurs as illustrated in FIG. 6E. Thus, gaming device 10 provides a multi-trigger bonus.

Similarly, in another example, the first primary game is bet upon and played and three Queens occur as shown in FIGS. 6A through 6C. Next, the second primary game is bet upon and played and a straight occurs as illustrated in FIGS. 6D and 6E. In either of the above examples, the gaming device provides the player a multi-trigger bonus because at least one triggering event occurred in both primary games in the same play.

Another embodiment of the gaming device could freeze one of the primary games when at least one triggering event for that game has occurred and provide the player a certain number of plays on the other primary game to achieve at least one triggering event for that game. Should at least one triggering event occur during one of the certain number of plays on the other primary game, triggering events would be present in both primary games in the same play, thus triggering a multi-trigger bonus.

In yet another embodiment, when a triggering event occurs in the first primary game, it triggers a bonus round within the second display device. For example, when three identical symbols occur along a payline in a first primary game, the second display device automatically begins the second primary game. If a triggering event for the second primary game occurs, the gaming device provides a multi-trigger bonus because a triggering event occurred in at least two primary games in the same play.

The same could occur if a player initially operates the second primary game on the second display device and a triggering event occurs. The first primary game within the first display device automatically begins as a result of the triggering event's occurrence within the second display device. If a triggering event occurs on the first primary game within the first display device, the gaming device provides the player with a multi-trigger bonus because at least one triggering event occurred on at least two primary games in the same play.

It should be appreciated that other combinations of events could lead to having at least two triggering events occur in the same play, thus triggering a multi-trigger bonus. It should also be appreciated that the present invention includes gaming devices having more than two base games. In these embodiments, the gaming device could award a multi-trigger bonus upon at least two triggering events occurring in any combination of or all of the primary or base games played in the same play.

Awards and Triggering Events

One advantage of the present invention is the ability to enable a player to play multiple games and to be able to collect conventional winnings from each primary game in the form of bonus award opportunities while having the possibility of a much larger payoff in the form of a multi-trigger bonus if triggering events occur in multiple games. In addition, the triggering events can vary from game to game, and different triggering events may trigger different bonus award opportunities or different multi-trigger bonuses. Also, the multi-trigger bonus may or may not be triggered by the same triggering events that trigger bonus award opportunities in the primary games played.

Figure 7A:
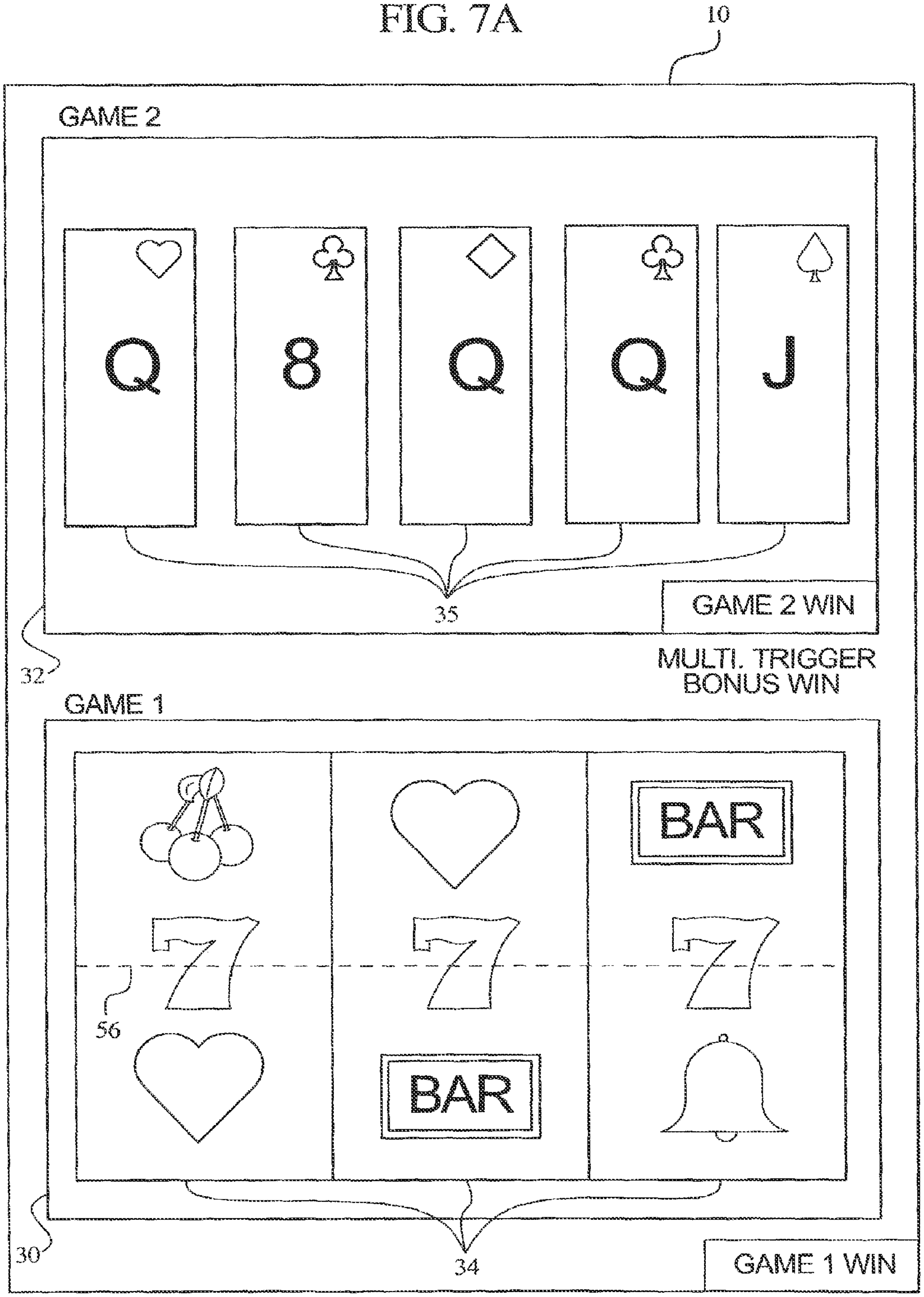
FIGS. 7A, 7B and 7C are front plan views of a gaming device in which different triggering events have occurred where the device can provide a multi-trigger bonus.
Figure 7B:
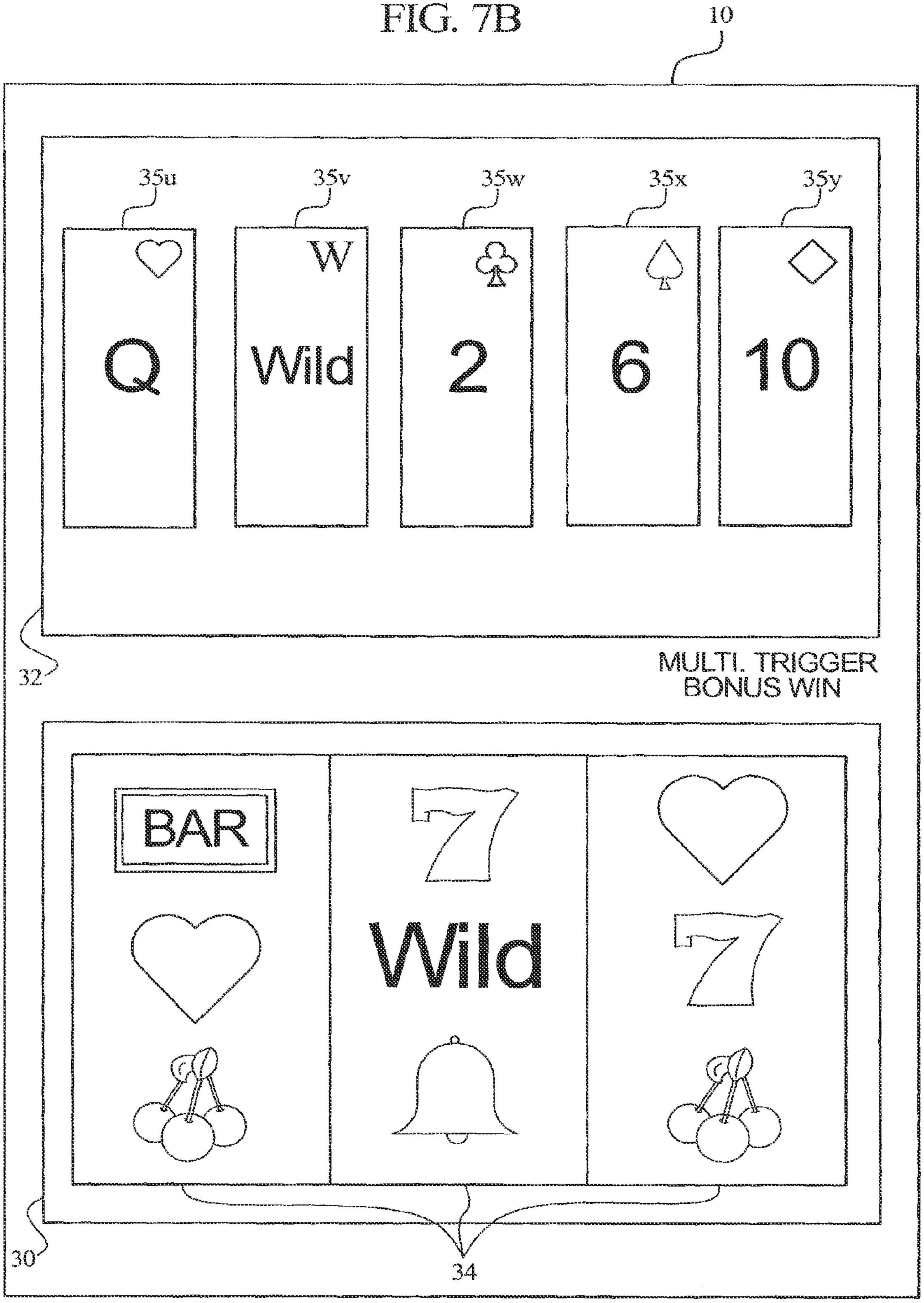
Figure 7C:
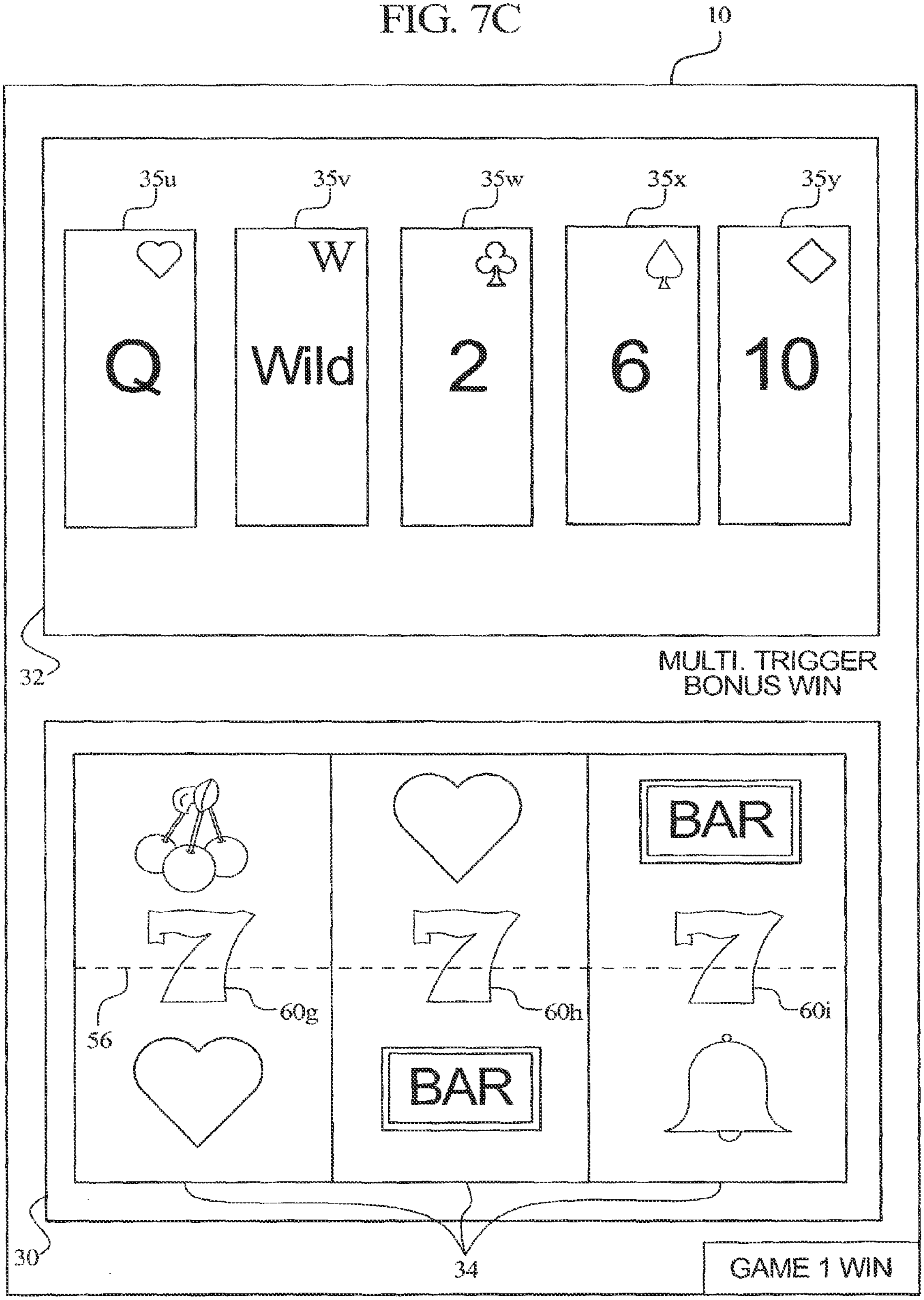

In one embodiment, the gaming device has two primary games, a slot-type game and a video poker game as illustrated in FIGS. 7A through 7C. A triggering event for a bonus award opportunity for the slot-type game is three "7" symbols occurring on a payline. A triggering event for a bonus award opportunity for the video poker game is three Queens occurring in a single hand. In addition, a wild symbol may occur on any of the reels of the slot game, and a corresponding wild card may occur in the video poker game. A wild symbol or card occurring in either game by itself does not trigger a bonus award opportunity. In this embodiment, gaming device 10 can provide a multi-trigger bonus if any of three situations occur. First, three "7" symbols occur in a payline on the slot game and three Queens occur in the video poker game in the same play as illustrated in FIG. 7A. Second, a wild symbol occurs in the slot game and a wild card occurs in the video poker game in the same play as illustrated in FIG. 7B. Third, a wild symbol or card occurs in one game and a triggering event as described above occurs in the other game in the same play as illustrated in FIG. 7C.

The first situation in the example above and as illustrated in FIG. 7A represents where a triggering event that triggers a bonus award opportunity for a primary game can trigger a multi-trigger bonus. The second situation above and as illustrated in FIG. 7B represents where a triggering event for a multi-trigger bonus is different from a triggering event for a bonus award opportunity. The third situation above and as illustrated in FIG. 7C represents where a combination of trigging events that do and do not trigger a bonus award opportunity together trigger a multi-trigger bonus. Different embodiments of the invention will provide a multi-trigger bonus when different situations occur. It should be appreciated that the invention includes other situations that involve different triggering events and combinations of events that trigger a bonus award opportunity or multi-trigger bonus.

When the gaming device provides a multi-trigger bonus, the player may receive an extra bonus award, extra bonus game, extra bonus award opportunity, or other award. A multi-trigger bonus may be embodied in many ways. In one embodiment, upon the occurrence of a multi-trigger bonus, the gaming device automatically provides the player with a large bonus or jackpot award. In another embodiment, the gaming device enables the player to play a unique bonus game that determines a bonus award for the player. The unique bonus game can be played on display device 31 as shown in FIG. 1A and/or display devices 30 and/or 32 as shown in FIGS. 1A, 1B and 1C. In another embodiment, upon the occurrence of a multi-trigger bonus, the player receives multiple bonus award opportunities. For example, upon the occurrence of multiple triggering events that trigger a multi-trigger bonus, the gaming device provides the player with two or more times the bonus award opportunities associated with each triggering event.

The awards associated with a multi-trigger bonus and a bonus award opportunity may be awarded together or separately and may or may not be associated. In one embodiment, a multi-trigger bonus is provided when the first situation in the example above occurs as illustrated in FIG. 7A, when a triggering event that triggers a bonus award opportunity occurs in the same play in each primary game. In this embodiment, the gaming device provides the player with the bonus award opportunity for each primary game before or in addition to the multi-trigger bonus. In another embodiment, the gaming device provides the multi-trigger bonus in lieu of the bonus award opportunities associated with the primary games played.

Further, different triggering events may trigger different bonus award opportunities, and different combinations of triggering events may trigger different multi-trigger bonuses. Referring again to the example above, a different multi-trigger bonus may be awarded when each of the three situations occur. For example, in the first situation as illustrated in FIG. 7A, the bonus award opportunity for each primary game is a secondary or bonus game. When the secondary or bonus game is triggered in each primary game in the same play, the multi-trigger bonus is a multiplier applied to the awards provided by the secondary or bonus games. In the second situation as illustrated in FIG. 7B, the multi-trigger bonus is a different multiplier applied to the secondary or bonus game triggered. In the third situation as illustrated in FIG. 7C, the multi-trigger bonus is a bonus award provided to the player. In other embodiments of the invention, the same multi-trigger bonus is provided in each of the three situations. It should be appreciated that the invention includes other combinations and types of bonus award opportunities and multi-trigger bonuses.

Figure 8:
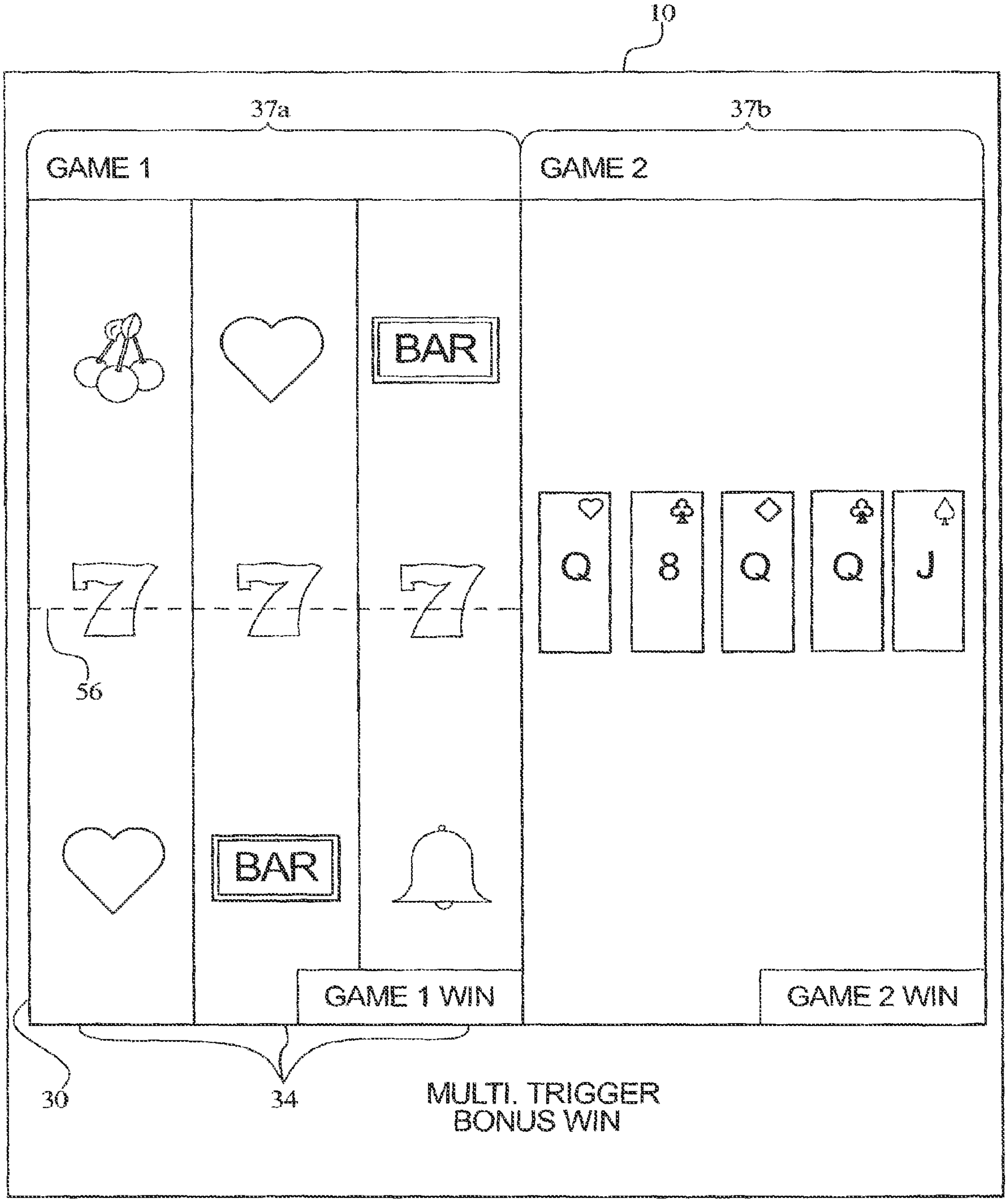
FIG. 8 is a front plan view of a gaming device having one display device and two games in which triggering events have occurred in both games of the gaming device.

In another embodiment of the invention, two primary games are displayed on a single display device 30 as illustrated in FIG. 8. In this embodiment, the display device is a video monitor. Each base game occupies half the screen in sections 37*a* and 37*b*. The games can be of the same type or can be different, and can have identical or different triggering events. A player operates both games separately or simultaneously. If the player operates both games and at least one triggering event occurs in both primary games in the same play as illustrated in FIG. 8, the gaming device provides the player with a multi-trigger bonus.

The anticipation of the larger awards through the multi-trigger bonus in addition to the ability to collect awards from each primary game separately makes this invention attractive and entertaining to a player. Further, the flexibility of which types of primary games that can be played within the scope of the invention and the numerous possible triggering events for bonus award opportunities and combinations of triggering events for multi-trigger bonuses ensure that the invention will attract and entertain different players.

While the present invention is described in connection with what is presently considered to be the most practical and preferred embodiments it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A method of operating a gaming system, said method comprising:

(a) causing at least one processor to execute a plurality of instructions stored in at least one memory device to operate with at least one display device to display a play of a first primary game, said first primary game having at least a first triggering event;

(b) causing the at least one processor to execute the plurality of instructions to operate with the at least one display device to display a play of a second primary game, said second primary game having at least a second triggering event, wherein the first triggering event and the second triggering event are configured to be independently generated;

(c) causing the at least one processor to execute the plurality of instructions to operate with the at least one display device to display a first bonus award opportunity upon an occurrence of the first triggering event in the play of the first primary game and if the second triggering event does not occur in the play of second primary game;

(d) causing the at least one processor to execute the plurality of instructions to operate with the at least one display device to display a second bonus award opportunity upon an occurrence of the second triggering event in the play of the second primary game and if the first triggering event does not occur in the play of the first primary game; and (e) causing the at least one processor to execute the plurality of instructions to operate with the at least one display device to display at least one multi-trigger bonus game upon the occurrence of the first triggering event in the play of the first primary game and the second triggering event in the play of the second primary game, wherein the first primary game and the second primary game are independently operable without regard to the other primary game.

2. The method of claim 1, wherein the first primary game and the second primary game are a same type of game.

3. The method of claim 1, wherein the first primary game and the second primary game are different types of games.

4. The method of claim 1, wherein the first triggering event and the second triggering event are the same.

5. The method of claim 1, wherein the first triggering event and the second triggering event are different.

6. The method of claim 1, wherein the first bonus award opportunity and the second bonus award opportunity are the same.

7. The method of claim 1, wherein the first bonus award opportunity and the second bonus award opportunity are different.

8. The method of claim 1, which is provided through a data network.

9. The method of claim 8, wherein the data network is an internet.

10. A method of operating a gaming system, said method comprising:

(a) causing at least one processor to execute a plurality of instructions stored in at least one memory device to operate with at least one display device to display plays of at least two primary games, wherein at least one triggering event can occur in each play of each primary game, and wherein each triggering event is configured to be independently generated;

(b) causing the at least one processor to execute the plurality of instructions to operate with the at least one display device to display at least one bonus award opportunity upon the occurrence of at least one of the triggering events in at least one play of at least one of the primary games and if at least one of the triggering events does not occur in any of the other plays of the other primary games; and (c) causing the at least one processor to execute the plurality of instructions to operate with the at least one display device to display at least one multi-trigger bonus game upon the occurrence of at least one of the triggering events in at least two of the plays of at least two of the primary games, wherein each of the primary games is independently operable without regard to any other of the primary games.

11. The method of claim 10, wherein each primary game is a same type of game.

12. The method of claim 10, wherein each primary game is a different type of game.

13. The method of claim 10, wherein at least two primary games are a same type of game and are different from at least one other primary game.

14. The method of claim 10, wherein the triggering events for each primary game are the same.

15. The method of claim 10, wherein the triggering events for each primary game are different.

16. The method of claim 10, which is provided through a data network.

17. The method of claim 16, wherein the data network is an internet.

18. A method of operating a gaming system, said method comprising:

(a) causing at least one processor to execute a plurality of instructions stored in at least one memory device to operate with at least one display device to display a play of a first primary game, said first primary game having at least a first triggering event;

(b) causing the at least one processor to execute the plurality of instructions to operate with the at least one display device to display a play of a second primary game, said second primary game having at least a second triggering event, wherein the first triggering event and the second triggering event are configured to be independently generated;

(c) causing the at least one processor to execute the plurality of instructions to operate with the at least on display device to display at least one bonus award opportunity upon the occurrence of at least one of the triggering events in at least one play of at least one of the primary games and if at least one of the triggering events does not occur in any other play of the other primary game; and (d) causing the at least one processor to execute the plurality of instructions to operate with the at least one display device to display at least one multi-trigger bonus game upon the occurrence of the first triggering event in the play of the first primary game and the second triggering event in the play of the second primary game, wherein the first primary game and the second primary game are independently operable without regard to the other primary game.

19. The method of claim 18, wherein the first primary game and the second primary game are a same type of game.

20. The method of claim 18, wherein the first primary game and the second primary game are different types of games.

21. The method of claim 18, wherein the first triggering event and the second triggering event are the same.

22. The method of claim 18, wherein the first triggering event and the second triggering event are different.

23. The method of claim 18, which is provided through a data network.

24. The method of claim 23, wherein the data network is an internet.

* * * * *

UNITED STATES PATENT AND TRADEMARK OFFICE

CERTIFICATE OF CORRECTION

PATENT NO. : 8,449,390 B2
APPLICATION NO. : 13/430226
DATED : May 28, 2013
INVENTOR(S) : Joseph E. Kaminkow It is certified that error appears in the above-identified patent and that said Letters Patent is hereby corrected as shown below:

IN THE CLAIMS

Claim 10, Column 12, Line 21, replace the first instance of “the” with --an--.
Claim 10, Column 12, Line 29, replace the first instance of “the” with --an--.
Claim 18, Column 12, Line 64, replace “on” with --one--.
Claim 18, Column 12, Line 66, replace the first instance of “the” with --an--.
Claim 18, Column 13, Line 6, replace the first instance of “the” with --an--.

Signed and Sealed this
Seventh Day of January, 2014

Margaret A. Focarino
*Commissioner for Patents of the United States Patent and Trademark Office*